US010940901B2

(12) United States Patent
Miyazaki

(10) Patent No.: US 10,940,901 B2
(45) Date of Patent: Mar. 9, 2021

(54) TRACTOR

(71) Applicant: Yanmar Co., Ltd., Osaka (JP)

(72) Inventor: Takeshi Miyazaki, Osaka (JP)

(73) Assignee: YANMAR POWER TECHNOLOGY CO., LTD., Osaka (JP)

(*) Notice: Subject to any disclaimer, the term of this patent is extended or adjusted under 35 U.S.C. 154(b) by 113 days.

(21) Appl. No.: 15/741,997

(22) PCT Filed: Mar. 22, 2016

(86) PCT No.: PCT/JP2016/059064
§ 371 (c)(1),
(2) Date: Jan. 4, 2018

(87) PCT Pub. No.: WO2017/006592
PCT Pub. Date: Jan. 12, 2017

(65) Prior Publication Data
US 2018/0194408 A1 Jul. 12, 2018

(30) Foreign Application Priority Data

Jul. 7, 2015 (JP) .............................. JP2015-135986

(51) Int. Cl.
B62D 49/06 (2006.01)
E02F 9/20 (2006.01)
(Continued)

(52) U.S. Cl.
CPC .......... *B62D 49/0692* (2013.01); *B62D 1/04* (2013.01); *B62D 1/12* (2013.01); *B62D 33/0617* (2013.01);
(Continued)

(58) Field of Classification Search
CPC . B62D 1/12; E02F 9/16; E02F 9/2004; G05G 1/01
See application file for complete search history.

(56) References Cited

U.S. PATENT DOCUMENTS 8,132,591 B2  3/2012 Nishino
8,931,586 B2 * 1/2015 Wakino .............. B62D 33/0617
                                              180/315
(Continued)

FOREIGN PATENT DOCUMENTS

EP    2700754 A1   2/2014
JP    H2-070838 A  3/1990
(Continued)

OTHER PUBLICATIONS

International Search Report dated Jul. 12, 2016 issued in corresponding PCT Application PCT/US2016/059064.
(Continued)

*Primary Examiner* — Nicole T Verley
(74) *Attorney, Agent, or Firm* — Norton Rose Fulbright US LLP

(57) ABSTRACT

A tractor in which various main manipulation parts are arranged on the right side of a driver, to allow the manipulation parts and a steering wheel to be reliably grasped with different hands, thus improving workability for the driver; and the various main manipulation parts are arranged within a semi-arc range over which a right arm of the driver turns about his/her right elbow which rests on an arm rest, thus improving workability for the driver and relieving driver fatigue. The tractor includes an operation unit in which a loader manipulation part and a hydraulic manipulation part are arranged near a driver seat disposed at the rear of a steering wheel, the loader manipulation part and the hydraulic manipulation part being arranged within a semi-arc range over which a right arm of a driver turns about his/her right elbow which rests on a right arm rest of the driver seat.

8 Claims, 21 Drawing Sheets

(51) Int. Cl.

| | |
|---|---|
| *E02F 9/16* | (2006.01) |
| *B62D 33/06* | (2006.01) |
| *E02F 9/08* | (2006.01) |
| *G05G 1/01* | (2008.04) |
| *B62D 1/04* | (2006.01) |
| *B62D 1/12* | (2006.01) |
| *B62D 49/00* | (2006.01) |
| *B62D 25/14* | (2006.01) |

(52) U.S. Cl.
CPC .............. *E02F 9/0808* (2013.01); *E02F 9/16* (2013.01); *E02F 9/2004* (2013.01); *G05G 1/01* (2013.01); *B60Y 2200/221* (2013.01); *B62D 25/14* (2013.01); *B62D 49/00* (2013.01)

(56) References Cited

U.S. PATENT DOCUMENTS

| | | | | |
|---|---|---|---|---|
| 9,816,251 | B2* | 11/2017 | Sasakawa | ............ E02F 3/7609 |
| 2005/0034913 | A1 | 2/2005 | Dahl et al. | |
| 2008/0016976 | A1* | 1/2008 | Fukudome | ............ E02F 9/2004 |
| | | | | 74/471 XY |
| 2014/0056676 | A1* | 2/2014 | Wakino | .............. B62D 33/0617 |
| | | | | 414/694 |
| 2016/0053779 | A1 | 2/2016 | Komatsu et al. | |
| 2017/0167112 | A1* | 6/2017 | Nagai | ................... E02F 9/2004 |

FOREIGN PATENT DOCUMENTS

| | | | |
|---|---|---|---|
| JP | 2007-032651 A | | 2/2007 |
| JP | 2009-274474 A | | 11/2009 |
| JP | 2011-230639 A | | 11/2011 |
| JP | 2012-038198 A | | 2/2012 |
| JP | 2012-087747 A | | 5/2012 |
| JP | 2012-188861 A | | 10/2012 |
| JP | 2014-166815 A | | 9/2014 |
| JP | 2015-009594 A | | 1/2015 |
| JP | 2015-033356 A | | 2/2015 |
| JP | 2015-042140 A | | 3/2015 |
| JP | 2015042140 A | * | 3/2015 |
| JP | 2016-041565 A | | 3/2016 |
| WO | 2008/050489 A1 | | 5/2008 |
| WO | 2015/019943 A1 | | 2/2015 |
| WO | WO-2016060061 A1 | * | 4/2016 ............. B62D 49/00 |

OTHER PUBLICATIONS

Office Action dated Aug. 15, 2017 to corresponding Japanese Patent Application No. 2016-544174.

Decision to Refuse Amendment dated Oct. 24, 2017 to corresponding Japanese Patent Application No. 2016-544174.

Notice of Allowance dated Feb. 6, 2018 to corresponding Japanese Patent Application No. 2016-544174.

Supplementary European Search Report dated Mar. 6, 2019 to corresponding European Patent Application No. EP 16821063.1.

* cited by examiner

TRACTOR

CROSS REFERENCES TO RELATED APPLICATIONS

This application is a national stage application pursuant to 35 U.S.C. § 371 of International Application No. PCT/JP2016/059064, filed on Mar. 22, 2016, which claims priority under 35 U.S.C. § 119 to Japanese Patent Application No. 2015-135986, filed on Jul. 7, 2015, the disclosures of which are hereby incorporated by reference in their entireties.

TECHNICAL FIELD

The present invention relates to a structure for arranging various manipulation parts in a tractor that is configured such that a work machine is couplable to the rear end thereof for use in agricultural work.

BACKGROUND ART

Conventionally, a tractor includes: a motor unit mounted in a front portion of a machine body frame; an operation unit provided at the rear thereof; and a PTO shaft protruding from the rear end of a transmission case which extends from the motor unit along the machine body frame, the tractor being configured to tow a work machine coupled to the rear end of a tractor main body while traveling with front and rear wheels provided on axle shafts which extend out of front and rear axle cases disposed below the machine body frame, to thereby perform agricultural work with a motive force transmitted from the PTO shaft to the work machine.

In the operation unit, various manipulation parts for operating the work machine are appropriately arranged on left and right sides of a driver seat, for improvement in operability for a driver (for example, see Patent Literature 1; hereinafter PTL 1).

CITATION LIST

Patent Literature

PTL 1: Japanese Patent Application Laid-Open No. 2011-230639

SUMMARY OF INVENTION

Technical Problem

The above-mentioned tractor, in which the various manipulation parts are arranged on left and right sides of the driver seat, enables the various manipulation parts to be manipulated without hindering driving of the tractor which is performed with use of a steering wheel located in front of the driver seat.

The manipulation of the various manipulation parts, however, may sometimes need to be performed over a long period depending on the contents of work, the type of the towed work machine, and the like. Moreover, the manipulation of the manipulation parts is performed during driving of the tractor, and therefore it is necessary to manipulate them while grasping the various manipulation parts simultaneously with grasping the steering wheel, which raises an urgent issue in terms of workability and driver fatigue.

The invention aims to provide a tractor in which: various main manipulation parts are arranged on the right side of a driver, to allow the manipulation parts and a steering wheel to be reliably grasped with different hands, thus improving workability for the driver; and the various main manipulation parts are arranged within a semi-arc range over which a right arm of the driver turns about his/her right elbow which rests on an arm rest, thus improving workability for the driver and relieving driver fatigue.

Solution to Problem

A tractor according to an aspect of the present invention is a tractor including an operation unit in which a loader manipulation part and a hydraulic manipulation part are arranged near a driver seat disposed at the rear of a steering wheel, the loader manipulation part and the hydraulic manipulation part being arranged within a semi-arc range over which a right arm of a driver turns about his/her right elbow which rests on a right arm rest of the driver seat.

In a tractor according to another aspect of the present invention, a bracket of the hydraulic manipulation part may be secured to a fender outer surface of a fender protruding in a cabin that accommodates the operation unit, and the fender outer surface and at least either one of the bracket of the hydraulic manipulation part and a bracket of the loader manipulation part may be collectively covered with a guide member that supports the loader manipulation part and the hydraulic manipulation part.

A tractor according to another aspect of the present invention may include an accelerator-linked main transmission pedal for controlling an engine rotation speed or a vehicle speed, the loader manipulation part being provided at the rear of the main transmission pedal.

Advantageous Effects of Invention

A tractor according to an aspect of the present invention is a tractor including an operation unit in which a loader manipulation part and a hydraulic manipulation part are arranged near a driver seat disposed at the rear of a steering wheel, the loader manipulation part and the hydraulic manipulation part being arranged within a semi-arc range over which a right arm of a driver turns about his/her right elbow which rests on a right arm rest of the driver seat. This can allow the steering wheel, and the loader manipulation part and the hydraulic manipulation part to be reliably grasped with different hands, so that driving of the tractor and manipulation of, for example, towing a work machine can be separated distinctly and performed concurrently. Accordingly, not only improvement in the workability but also considerable relief of work fatigue can be obtained, because the loader manipulation part and the like can be manipulated with the right elbow placed on the arm rest.

Since manipulation parts other than the loader manipulation part and the hydraulic manipulation part can be arranged within the semi-arc range over which the right arm turns, further improvement in the workability can be obtained.

In a tractor according to another aspect of the present invention, a bracket of the hydraulic manipulation part may be secured to a fender outer surface of a fender protruding in a cabin that accommodates the operation unit, and the fender outer surface and at least either one of the bracket of the hydraulic manipulation part and a bracket of the loader manipulation part may be collectively covered with a guide member that supports the loader manipulation part and the hydraulic manipulation part. Such a configuration, in which the manipulation parts are collectively arranged, can give visual integration to an external appearance, and also can allow driving of the tractor with the steering wheel and manipulation of, for example, towing a work machine with the manipulation parts, etc. to be distinctly separated in a visual sense, too, so that improvement in the workability can be obtained.

Since the brackets of the loader manipulation part and the hydraulic manipulation part can be collectively covered with the guide member instead of being respectively covered with different members, the workability in assembling can be improved, and moreover manufacture costs can be suppressed low.

A tractor according to another aspect of the present invention may include an accelerator-linked main transmission pedal for controlling an engine rotation speed or a vehicle speed, the loader manipulation part being provided at the rear of the main transmission pedal. This can enable the engine rotation speed or the vehicle speed to be controlled by pedal manipulation on the main transmission pedal, without the need to provide a hand-operable manipulation member such as a main transmission lever as a main transmission manipulation member. Accordingly, hand-operated manipulation objects can be reduced, which can improve workability at a time of manipulating the loader manipulation part, and also can reduce a work burden on the driver at a time of manipulating the loader manipulation part.

DESCRIPTION OF EMBODIMENTS

Figure 1:
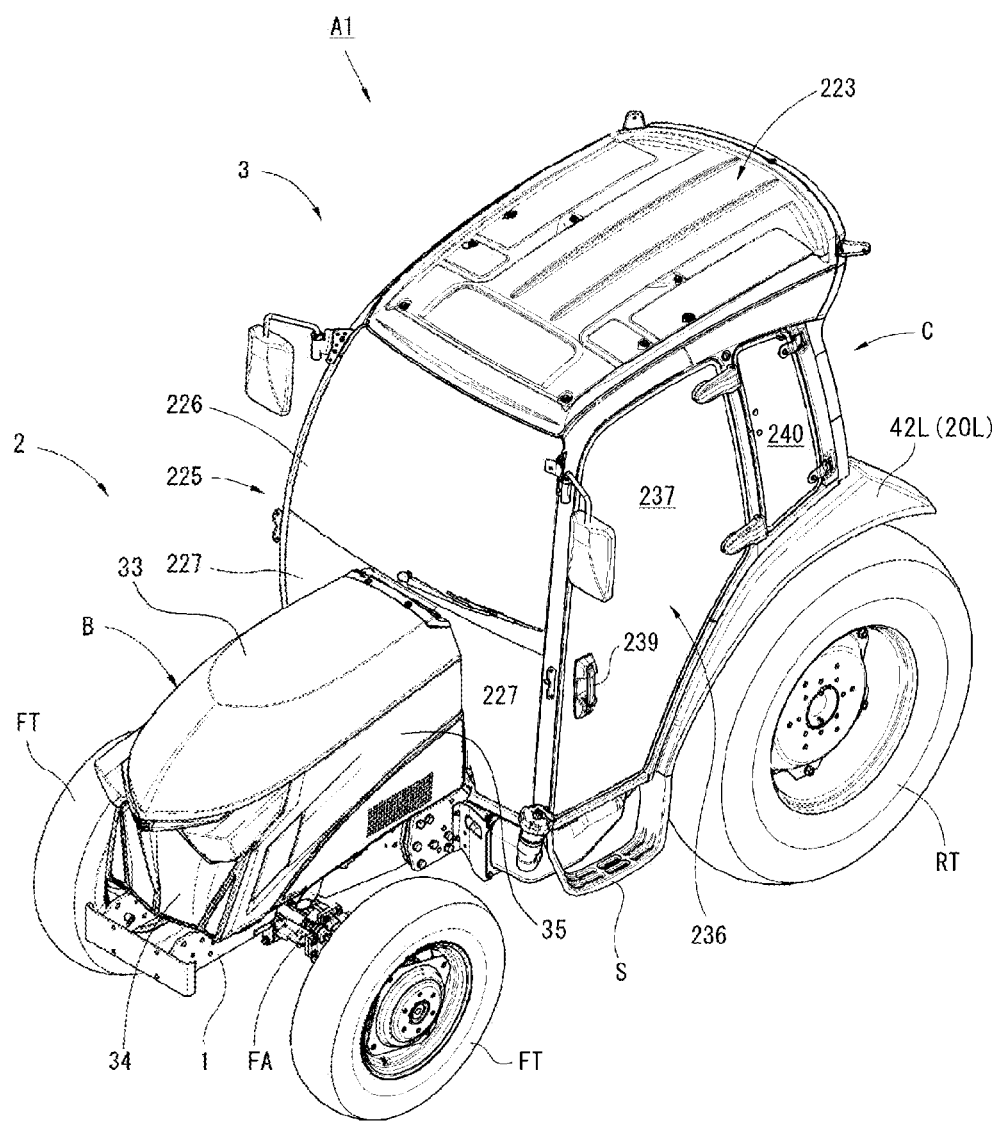
FIG. 1 A perspective view of a tractor according to an embodiment of the present invention.

In the following, an embodiment of the present invention will be described with reference to the drawings.

As for the terms front, rear, left, and right in the descriptions herein, the front side and the rear side of a tractor when seen from a driver seated on a driver seat are defined as front and rear, respectively, and the right side and the left side when seen from the driver are defined as right and left, respectively.

A tractor according to an embodiment of the present invention includes: a driver seat arranged at the rear of a steering wheel; and a loader manipulation part and a hydraulic manipulation part arranged near the driver seat, the loader manipulation part and the hydraulic manipulation part being arranged within a semi-arc range over which a right arm of the driver turns about his/her right elbow which rests on a right arm rest of the driver seat.

As shown in FIG. 1 to FIG. 4, a tractor A1 serving as a work vehicle includes: a machine body frame 1 made of elongated steel plates having a fixed width and extending in a front-rear direction, the elongated steel plates standing with the width thereof extending in a vertical direction, the elongated steel plates being arranged left and right; and a motor unit 2 mounted in a front portion thereof. An operation unit 3 is arranged at the rear of the motor unit 2. Below the machine body frame 1, front and rear wheels FT, RT are rotatably supported, to which a motive force is transmitted from an engine E through a transmission case M.

The transmission case M is integrally fixed to the machine body frame 1. A PTO shaft (not shown) protrudes at the rear end of the transmission case M. The PTO shaft is a shaft for transmitting a PTO driving force to a ground-engaging work machine such as a rotary tiller. The transmission case M is configured to transmit a motive force to a various work machines which can be coupled to a rear portion of the tractor A1 through a coupler, a lifter, etc. (not shown). Provided in the transmission case M are a hydraulic stepless transmission, a forward-reverse switching mechanism, a sub-transmission gear mechanism, a 2-wheel/4-wheel switching mechanism, a rear-wheel differential gear mechanism, and the like.

The tractor A1 is configured as a cabin type tractor with the operation unit 3 covered with a cabin C.

An overall configuration of the tractor A1 will first be described, and a configuration of the operation unit 3 which is a feature of the present invention will then be described.

[Overall Configuration]

As shown in FIG. 1 to FIG. 4, the tractor A1 includes: a machine body frame 1 that extends in the front-rear direction to form a framework; a motor unit 2 provided in a front portion of the machine body frame 1; and a transmission case M provided in a rear end portion of the machine body frame 1. The motor unit 2 and the transmission case M are interlockingly coupled to each other via a motive force transmission shaft (not shown).

A front axle case FA whose axis line is in the left-right direction is attached to a front portion of the machine body frame 1. Front wheels FT, FT are attached to left and right side end portions of the front axle case FA through a front wheel shaft (not shown).

Rear axle cases RA, RA are attached to left and right side portions of the transmission case M, respectively. Each of rear wheels RT, RT is interlockingly coupled to each of the rear axle cases RA, RA through a rear wheel shaft 4. The transmission case M and the front axle case FA are interlockingly coupled to each other through a front wheel drive shaft (not shown), to enable 4-wheel drive in which the front and rear wheels FT, RT are driven.

The tractor A1 has an operation unit 3 arranged at the rear of the motor unit 2 on the machine body frame 1. To be specific, the tractor A1 has the operation unit 3 placed on and fixed to left and right base frames 5 that are attached to lateral portions of the machine body frame 1. Each of the left and right base frames 5 has an incline frame 6 that is bent upward toward the rear. At a rear end portion of each of the left and right base frames 5, an auxiliary beam 8 is integrally provided so as to stand vertically with interposition of a horizontal coupling plate 7 which is provided in association with the rear axle case RA.

A front end of each of the left and right base frames 5 is placed on and fixed to an operation unit placement piece 11 with interposition of a vibration and sound absorbing plate 12, the operation unit placement piece 11 protruding sideways from the machine body frame 1. A rear end of each of the left and right base frames 5 has the auxiliary beam 8 attached thereto, with a lower end portion of the auxiliary beam 8 being placed on and fixed to each of the left and right rear axle cases RA, RA with interposition of a shock absorber 218 having the vibration and sound absorbing plate 12 provided thereon.

The operation unit 3 has an operation unit floor 9 serving as a floor surface part and extending over each of the left and right base frames 5 from a position directly at the rear of the motor unit 2 to a position directly in front of the transmission case M. To be specific, a floor placement plate 220 having an inverted U shape in a plan view and a floor reinforcing plate 221 having a rectangular shape in a plan view are disposed between the left and right base frames 5, on which left and right steps SL, SR each configured as a single piece are placed and fixed. Above them, the operation unit floor 9 is disposed in an overlapping manner.

A driver seat frame 14 for constituting a driver seat 13 is placed on and coupled to the incline frames 6 of the left and right base frames 5. The driver seat frame 14 includes: a horizontal seat frame 15; a backrest frame 16 that extends obliquely upward from a rear edge portion of the seat frame 15; a front frame 17 that hangs downward from the front end of the seat frame 15; and a dust proof plate 18 that extends frontward from the lower end of the front frame 17. The dust proof plate 18 is, by being coupled to a rear end edge portion of the operation unit floor 9, able to close the lower side of the front end of the driver seat frame 14, thus preventing dust and dirt, which stirs up from a ground surface into a space below the driver seat 13, from entering the operation unit 3.

Outer side surfaces of the backrest frame 16 are in tight contact with abutment plates 19 and fixed with a bolt, the abutment plates 19 having substantially triangular shapes and arranged so as to extend upward together with and in abutment with the outer side surfaces of the incline frames 6. In addition, a fender interior wall portion 21 of a fender 20 for covering the inside of the rear wheel RT is interposed between the seat frame 15 and the abutment plate 19 that extends upward from the incline frame 6 of each of the left and right base frames 5, so that the fender interior wall portion 21 is sandwiched between the seat frame 15 and the abutment plate 19, while these three members are integrally and tightly coupled to one another with bolts.

Above the transmission case M located at the rear of an engine E of the motor unit 2, the driver seat 13 is arranged, and a pair of left and right fenders 20L, 20R are arranged on the left and right lateral sides of the driver seat 13. The pair of left and right fenders 20L, 20R extend upward from left and right lateral rear portions of the operation unit floor 9, to cover upper front portions of the rear wheels RT, RT. The pair of fenders 20L, 20R are provided with outer fenders 42L, 42R that cover outer edge portions of the fenders 20L, 20R and that extend further outward.

Figure 5:
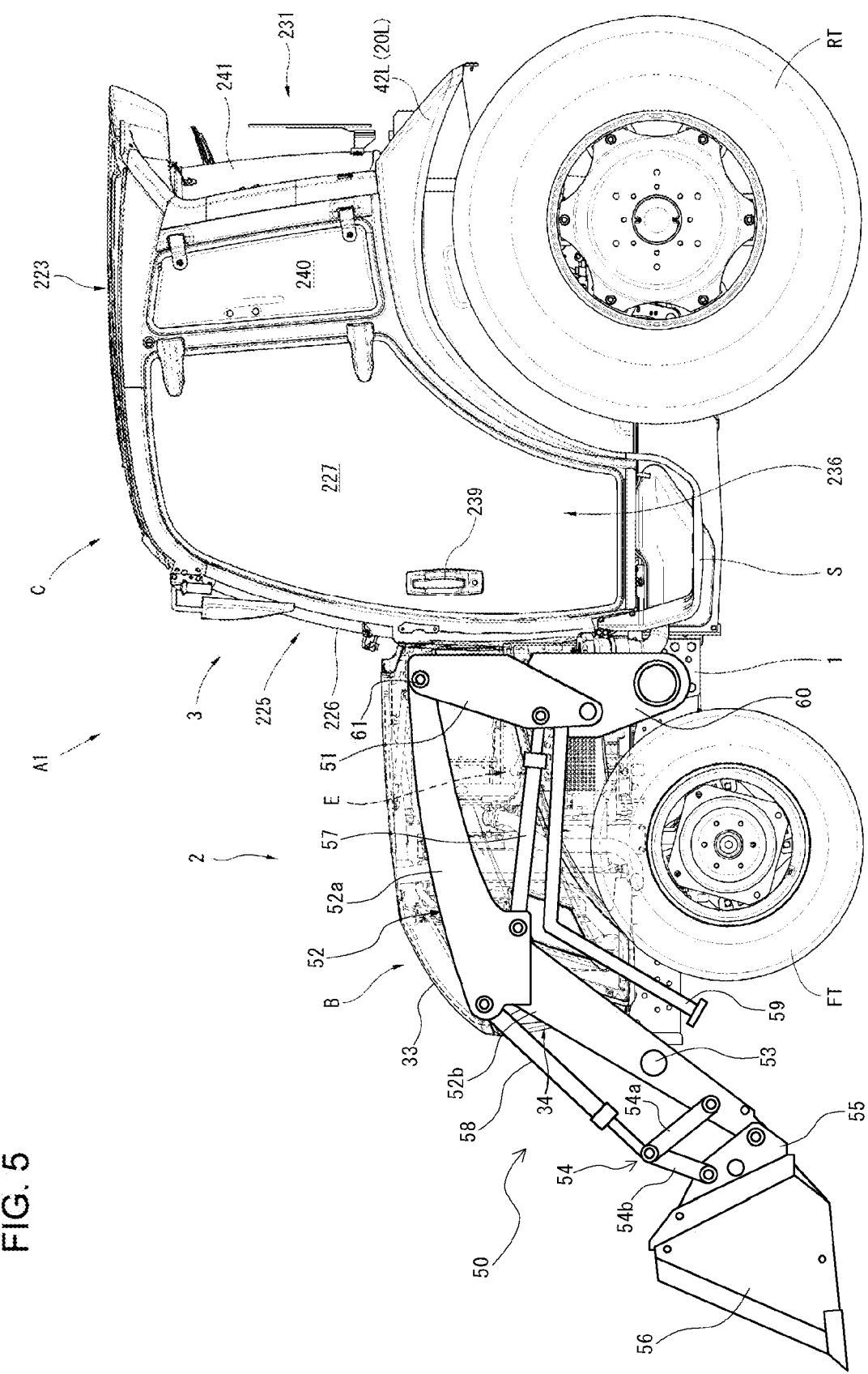
FIG. 5 A side view showing the tractor according to the embodiment of the present invention, with a front loader attached thereto.
Figure 6:
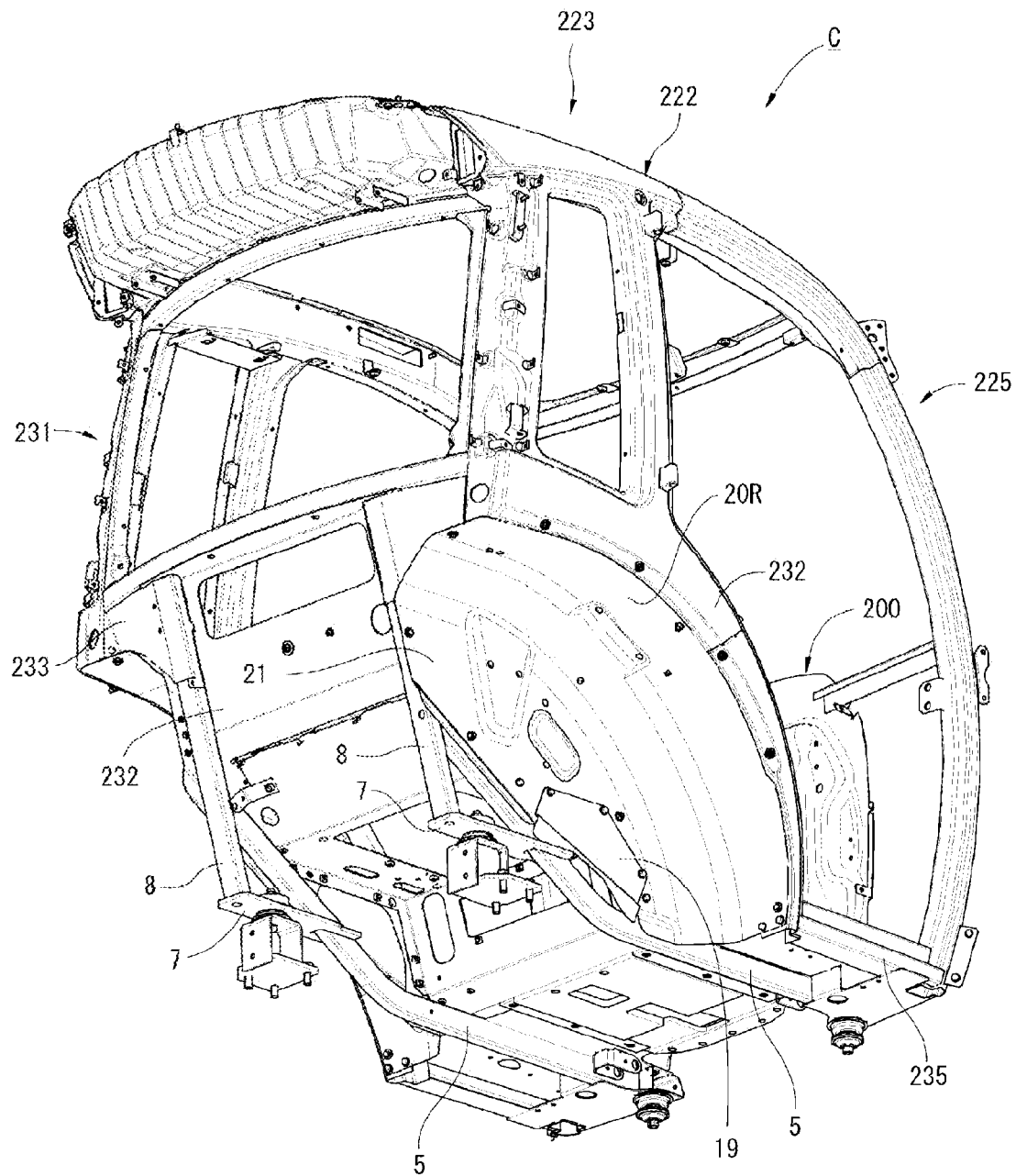
FIG. 6 A perspective view showing a cabin and the vicinity of the machine body frame of the tractor according to the embodiment of the present invention.

As shown in FIG. 5, a front loader 50 serving as a work machine is removably attached to a front portion of the machine body frame 1. The front loader 50 includes: a pair of left and right masts 51 that are removably provided to the machine body frame 1; a pair of left and right lift arms 52 that are coupled to the masts 51 in a vertically rotatable manner; a coupling pipe 53 that couples the pair of left and right lift arms 52; a pair of left and right work equipment links 54; a pair of left and right work equipment brackets 55; work equipment 56 that is attached to the pair of left and right lift arms 52; a pair of left and right arm cylinders 57; a pair of left and right work equipment cylinders 58; a stand 59; and a front guard that protects a front portion of the tractor A1. The front loader 50 lifts and lowers the work equipment 56 when performing works. Although this embodiment adopts a bucket as the work equipment 56, another work equipment may be attached.

A pair of left and right loader mounts 60 are secured to outer sides of left and right plate-like members that constitute the machine body frame 1. The pair of left and right masts 51 are removably attached to the pair of left and right loader mounts 60. The lift arm 52 is made up of a rear lift arm 52a attached to the mast 51 and a front lift arm 52b attached to the work equipment 56, and has a boomerang-like shape in a side view of the machine body. The rear lift arm 52a and the front lift arm 52b are fixed to each other by welding so as to form a predetermined angle.

Each of the left and right lift arms 52 has its rear end pivotally supported on a pivotal support shaft 61 in an upper end portion of the mast 51. Thereby, a front portion of the front loader 50 is vertically rotatable about the pair of left and right pivotal support shafts 61. A distal end portion (rear end) of a piston rod of the arm cylinder 57 is pivotally supported on a vertically middle, front end portion of the mast 51, and a proximal end portion (front end) of the arm cylinder 57 is pivotally supported on an arm cylinder bracket portion which is provided in a lower front end portion of the rear lift arm 52a. The pair of left and right arm cylinders 57 serve as an actuator for vertical rotation of the front loader 50. The piston rods of the left and right arm cylinders 57 extend or retract simultaneously, so that the vertical rotation angle of the front loader 50, which means the angle of the pair of left and right lift arms 52 relative to the mast 51, is adjusted.

The left and right front lift arms 52b are integrally fixed by their middle portions with respect to the front-rear direction being coupled to each other with the coupling pipe 53 whose longitudinal direction is along the width direction of the machine body. The front ends of the front lift arms 52b are attached to the work equipment 56 through the work equipment brackets 55. The work equipment brackets 55 pivotally support the front ends of the front lift arms 52b. Thus, the work equipment brackets 55 and the work equipment 56 are vertically rotatable about the pair of left and right lift arms 52.

Each work equipment link 54 includes an arm-side link member 54a and a work-equipment-side link member 54b. The lower end of the arm-side link member 54a is pivotally supported on a middle portion of the front lift arm 52b with respect to the front-rear direction. The lower end of the work-equipment-side link member 54b is pivotally supported on an upper portion of the work equipment bracket 55.

The work equipment cylinders 58 are attached on the upper side of a front end portion of the lift arm 52. The upper end portions of the arm-side link member 54a and the work-equipment-side link member 54b pivotally support the distal end portion of a piston rod of the work equipment cylinder 58. A proximal end portion of the work equipment cylinder 58 is pivotally supported on the upper side of the front end portion of the rear lift arm 52a. The pair of left and right work equipment cylinders 58 serve as an actuator for rotation of the work equipment brackets 55 in the front-rear direction. The piston rods of the left and right work equipment cylinders 58 extend or retract simultaneously, so that the bend angle of the work equipment link 54, which means the angle formed between the arm-side link member 54a and the work-equipment-side link member 54b, is adjusted, the rotation angle of the work equipment bracket 55 about the lift arm 52 with respect to the front-rear direction is adjusted, and the rotation angle of the work equipment 56 is adjusted.

Figure 10:
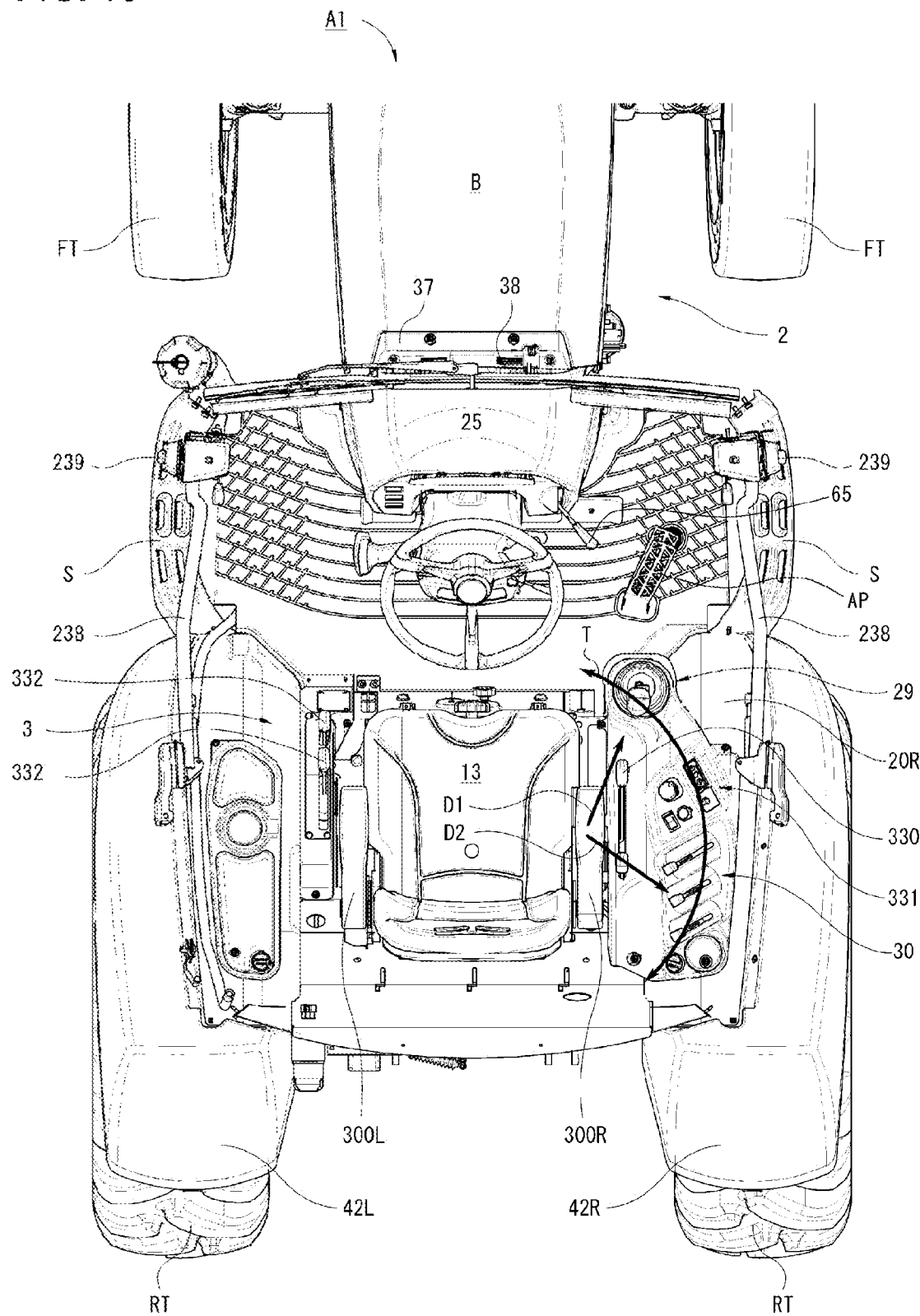
FIG. 10 A plan view of the operation unit of the tractor according to the embodiment of the present invention.
Figure 11:
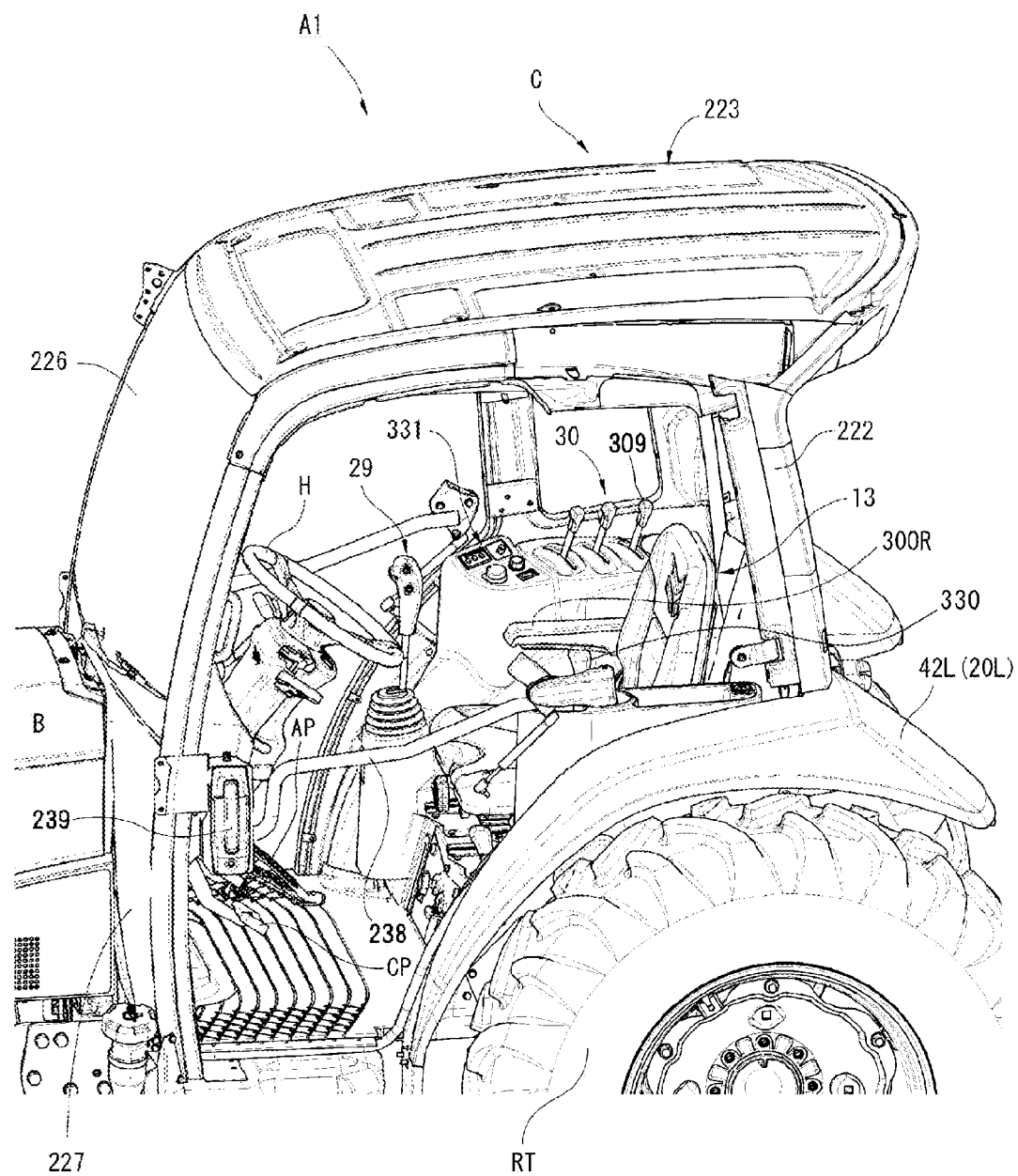
FIG. 11 A perspective view of the operation unit of the tractor according to the embodiment of the present invention.

As shown in FIG. 10 and FIG. 11, arranged on and near the fender 20R on the right lateral side of the operation unit 3 are a loader manipulation part 29 for lifting and lowering the front loader 50, a hydraulic manipulation part 30 for switching a hydraulic pressure output valve (not shown), other manipulation levers 330, 332, and switches 331.

Figure 3:
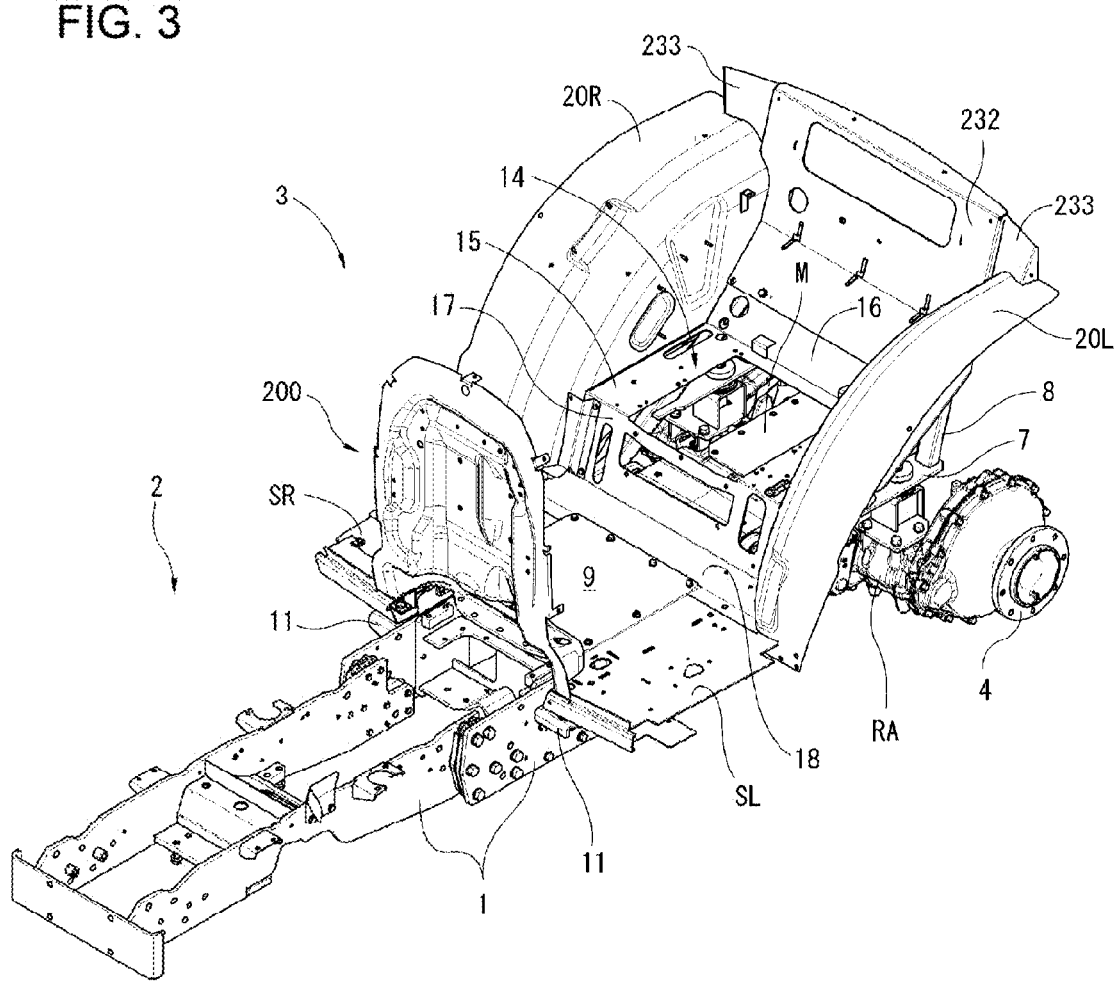
FIG. 3 A perspective view showing the vicinity of a machine body frame of the tractor according to the embodiment of the present invention.
Figure 8:
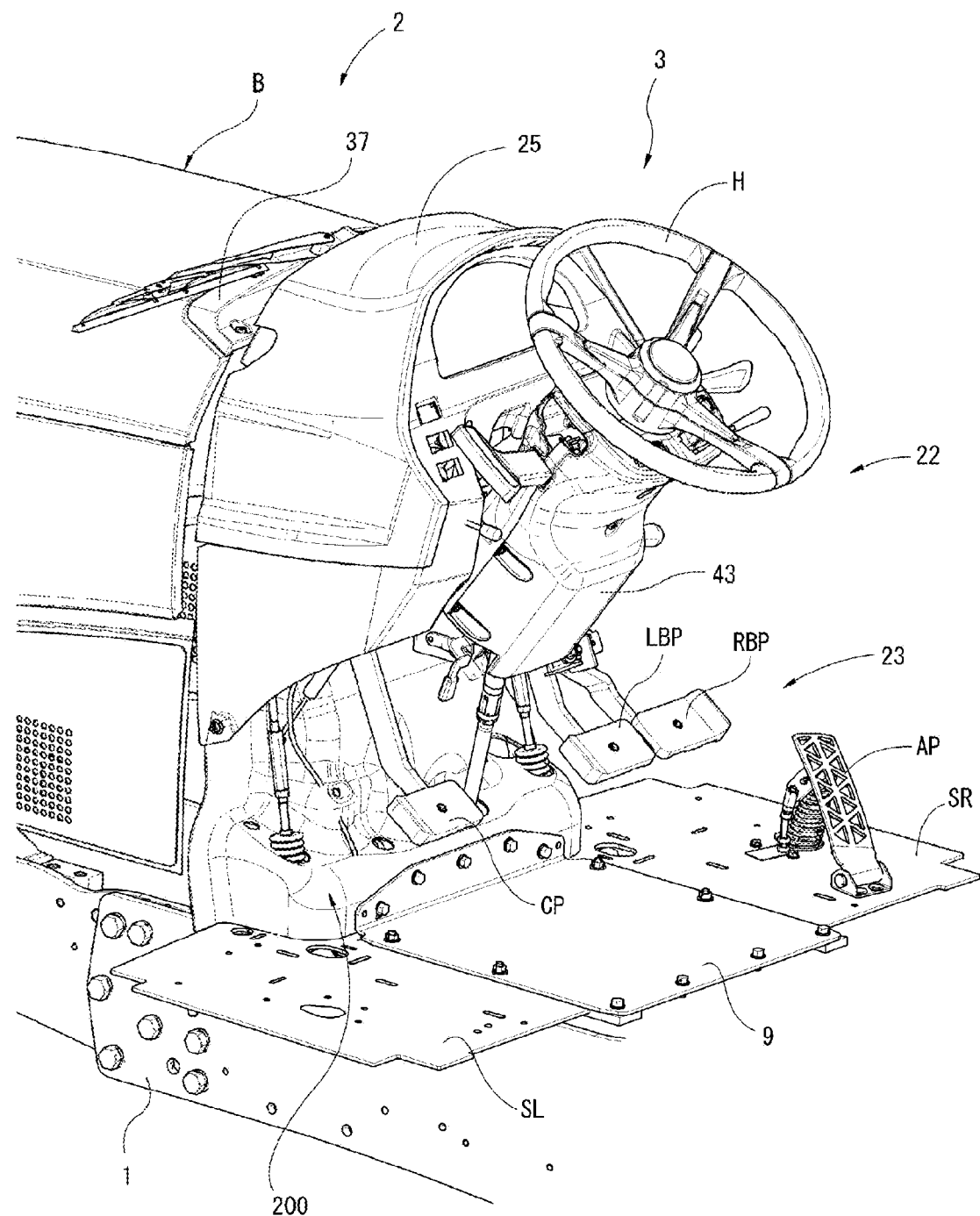
FIG. 8 A perspective view showing the vicinity of a hot-wind blocking plate of the tractor according to the embodiment of the present invention.
Figure 9:
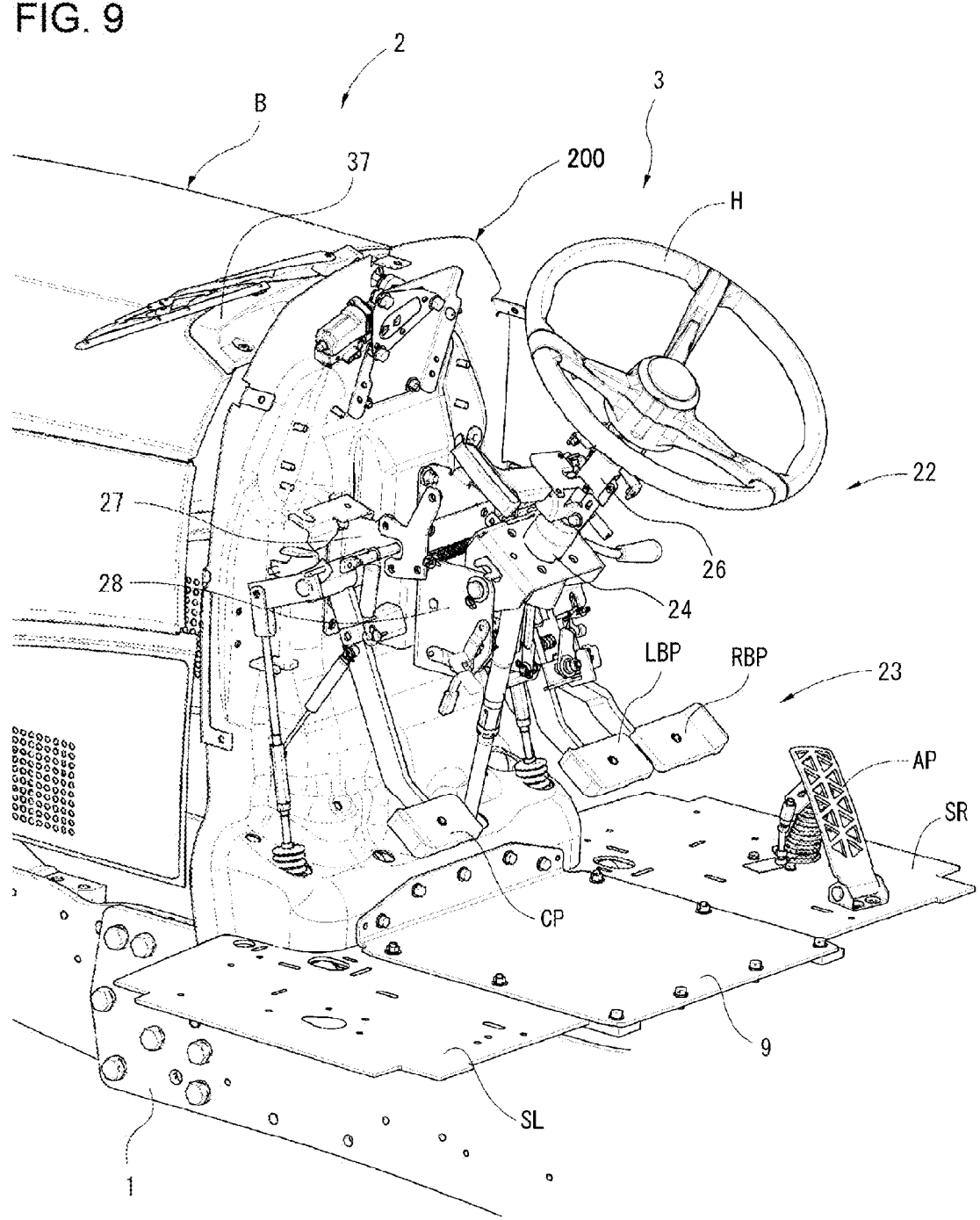
FIG. 9 A perspective view showing a part of an operation unit of the tractor according to the embodiment of the present invention.

As shown in FIG. 3, FIG. 8, FIG. 9, and the like, a hot-wind blocking plate 200 that separates the motor unit 2 and the operation unit 3 from each other is provided so as to stand in a front end edge portion of the operation unit floor 9. On the operation unit 3 side of the hot-wind blocking plate 200, a coupling case 27 protrudes, and in addition, a steering wheel H is provided on a steering column 24 with interposition of a steering wheel spindle 26, the steering column 24 being freely tiltably mounted on a steering bracket 28 fixed to the coupling case 27.

In front of and above the steering column 24, a dashboard 25 is attached to the upper end edge of the hot-wind blocking plate 200, and a steering cover 43 covers a steering mechanism 22 except the steering wheel H. An accelerator lever 65 for setting and keeping the rotation speed of the engine E is provided to the right of the steering cover 43.

Various operation pedals 23, which are supported on the coupling case 27 protruding from the hot-wind blocking plate 200, include a clutch pedal CP, a left brake pedal LBP, and a right brake pedal RBP arranged in this order from the left. An acceleration pedal AP is provided so as to protrude from the right step SR which constitutes a floor surface. The acceleration pedal AP functions as a main transmission pedal which is operable in cooperation with an accelerator for controlling the rotation speed of the engine E, the vehicle speed, or the like. A potentiometer (variable resistor) type pedal sensor for detecting a vertical movement of the acceleration pedal AP is fixed below the right step SR. The floor surface is substantially entirely a flat surface.

As shown in FIG. 10 and FIG. 11, the driver seat 13 including left and right arm rests 300L, 300R is placed on the horizontal seat frame 15 provided on the driver seat frame 14. As mentioned above, the loader manipulation part 29, the hydraulic manipulation part 30, the other various manipulation levers 330, 332, and the switches 331 for switching various modes are collectively arranged on the left and right sides of the driver seat 13, and particularly on and near the right fender 20R, to allow easy manipulation by the driver.

As shown in FIG. 1 and FIG. 4 to FIG. 7, a cabin C includes a cabin frame 222 having a hexahedral framework, and surface portions 223, 225, 231, 236 each formed of each piece constituting the cabin frame 222.

The cabin frame 222 includes a ceiling portion 224 in the shape of a flat box, arranged in a ceiling surface portion 223; a front glass portion 226 arranged in an upper portion of a front surface portion 225; and left and right side front wall portions 227 arranged in a lower portion of the front surface portion 225. In a middle of the lower portion of the cabin C, a hot-wind blocking plate 200 constitutes a part of the front surface portion 225 of the cabin C. Thus, the front surface portion 225 is constituted of the hot-wind blocking plate 200, the left and right side front wall portions 227 arranged to the left and right of the hot-wind blocking plate 200, and the front glass portion 226 arranged above the hot-wind blocking plate 200.

Figure 4:
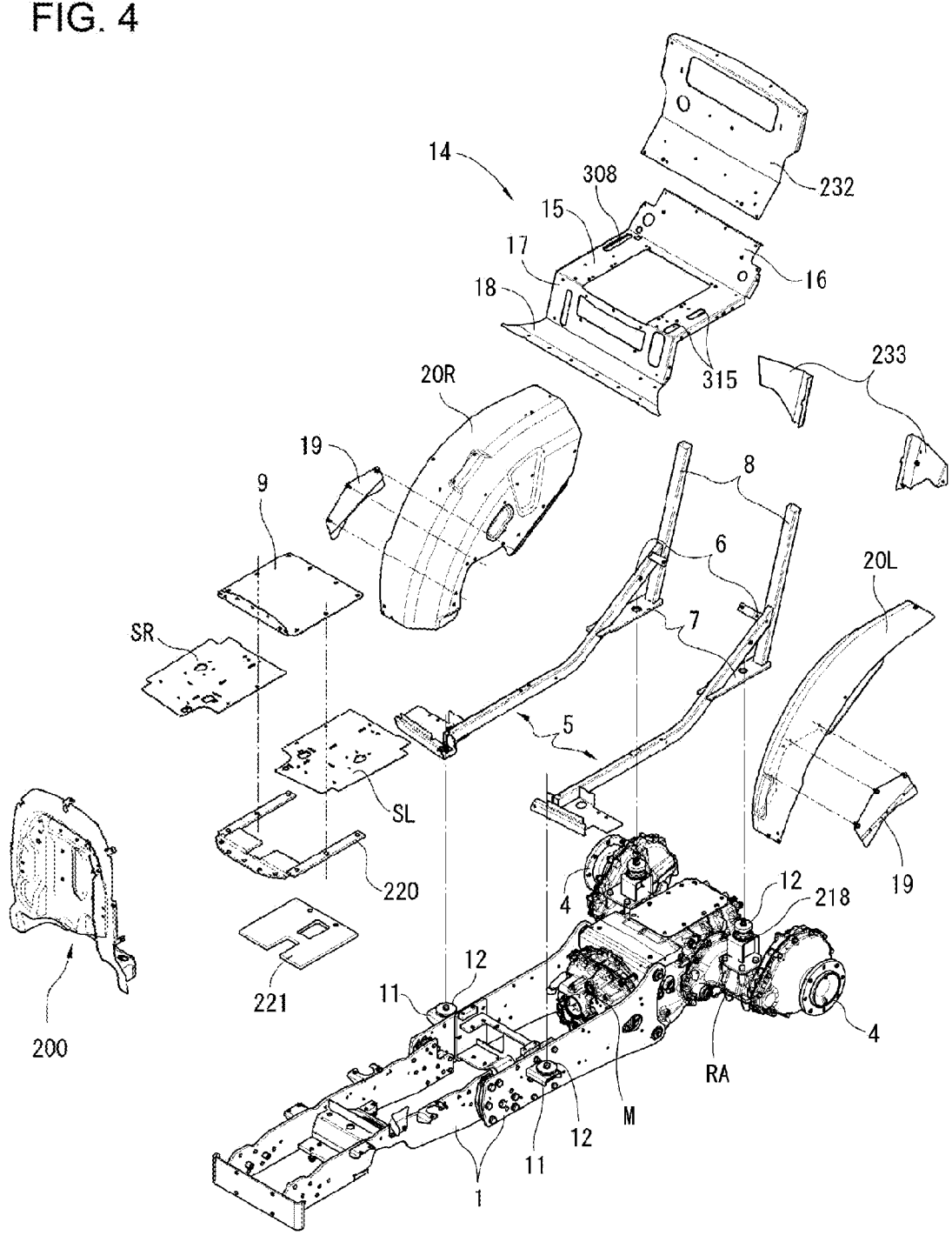
FIG. 4 An exploded perspective view showing the vicinity of the machine body frame of the tractor according to the embodiment of the present invention.
Figure 7:
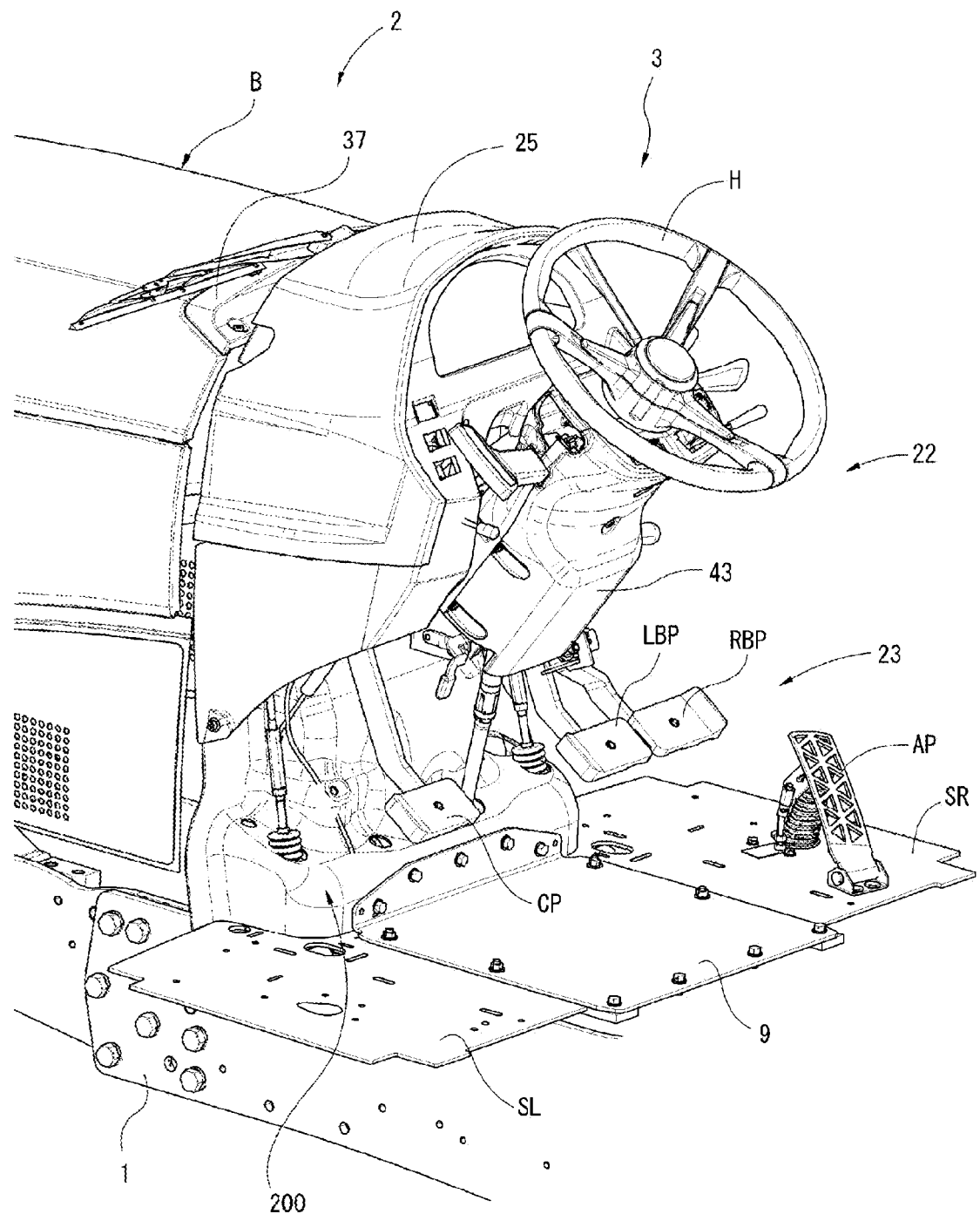
FIG. 7 A rear perspective view of the cabin of the tractor according to the embodiment of the present invention.

As shown in FIG. 3, FIG. 4, and FIG. 7, a rear surface portion 231 integrally connects the upper ends of the auxiliary beams 8 to the rear ends of the fenders 20 and the lower rear end of the cabin frame 222 with interposition of a coupling bracket 233. A rear lateral frame 232 provided in a middle section of a rear surface of the cabin frame 222 is integrally coupled to the backrest frame 16 of the driver seat frame 14 with a bolt.

Figure 13:
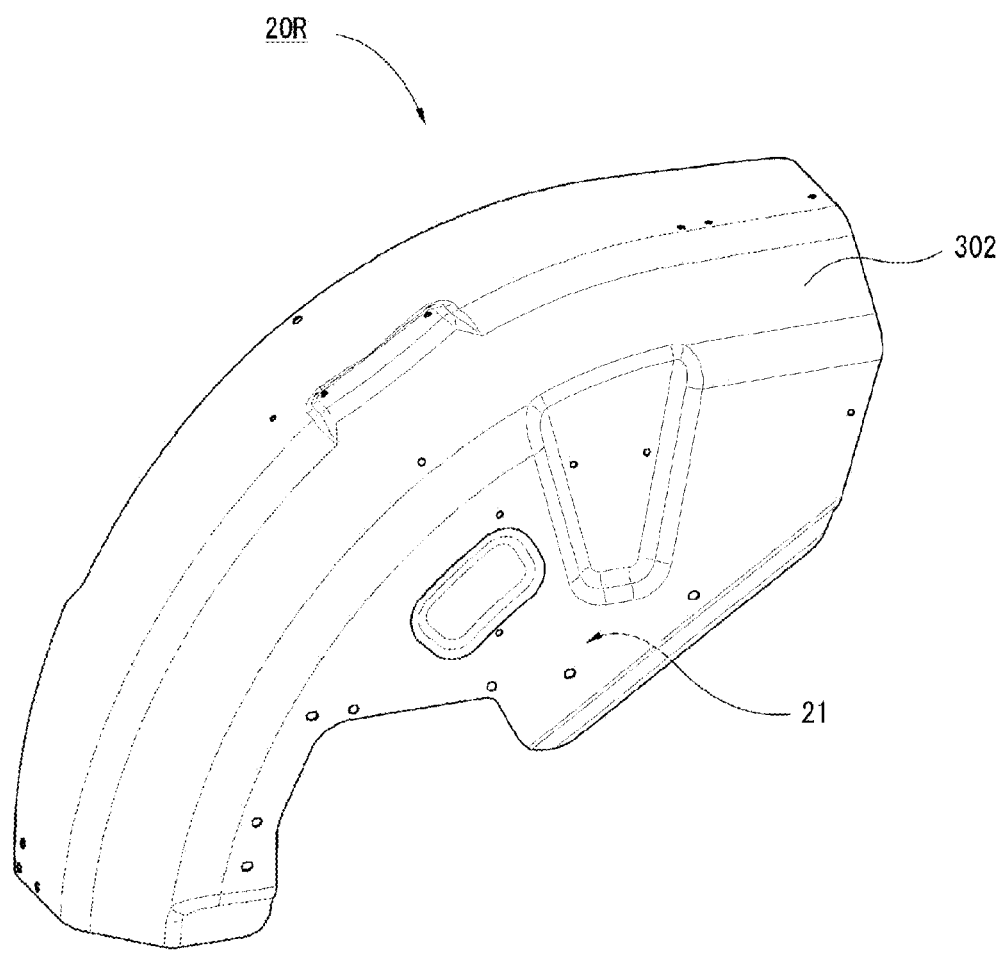
FIG. 13 A perspective view of a right fender of the tractor according to the embodiment of the present invention.
Figure 14:
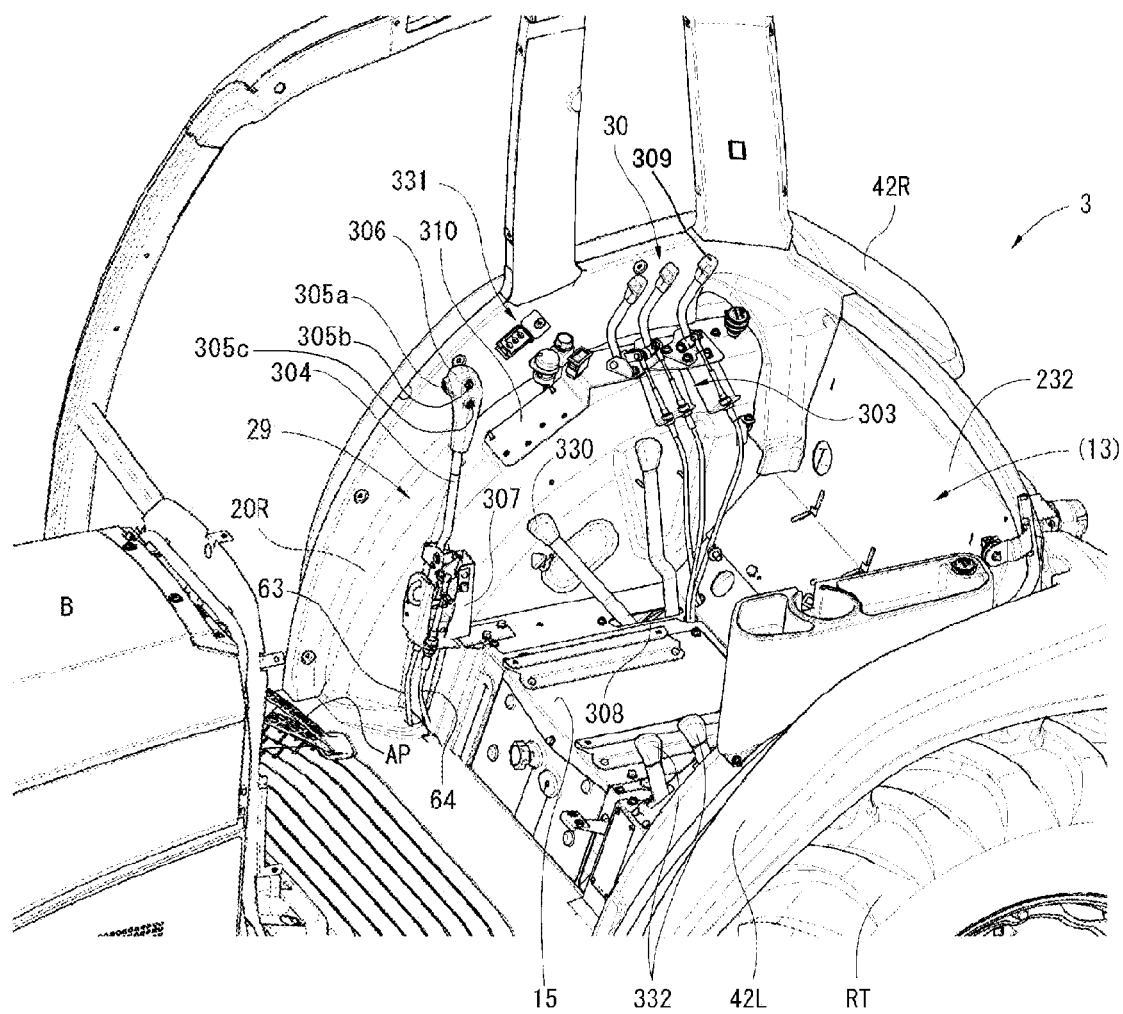
FIG. 14 A perspective view of the operation unit of the tractor according to the embodiment of the present invention.

In addition, a lower end edge portion of a front portion of the cabin frame 222, that is, a lower horizontal frame 235 arranged in front of a semi-arc frame 234 placed on the fender 20, is integrally formed in abutment with an outer edge portion of a step S, as shown in FIG. 13 and FIG. 14.

In front portions of the left and right side surface portions 236, a pair of left and right platform door parts 237, 237 are arranged in a freely openable and closable manner. As shown in FIG. 11, an open/close grip 239 is provided to an outer portion of the platform door part 237. A grip pipe 238 is provided to an inner surface of the platform door part 237.

A pair of left and right side window portions 240 are arranged at the rear of the left and right side surface portions 236 in a freely openable and closable manner. In the rear surface portion 231, a rear glass portion 241 is arranged in a freely openable and closable manner.

Figure 2:
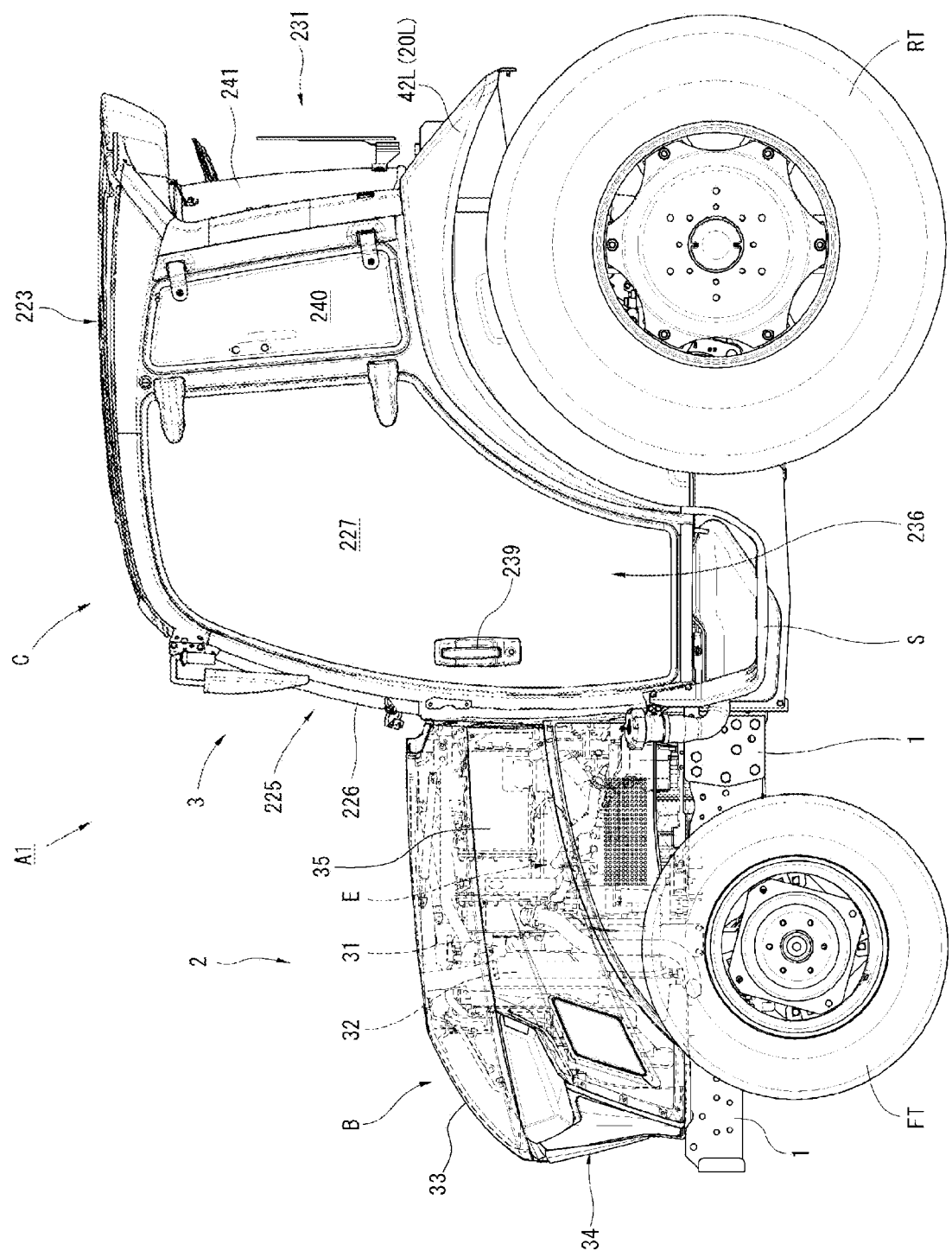
FIG. 2 A side view of the tractor according to the embodiment of the present invention.

As shown in FIG. 2, the motor unit 2 includes the engine E and the like arranged in the front portion of the machine body frame 1. A cooling fan 31 and a radiator 32 are provided so as to stand directly in front of the engine E.

The motor unit 2 having the above-described configuration is provided with a hood support frame body (not shown), and a hood B is attached to the hood support frame body in a freely openable and closable manner. The hood B is able to close and open an engine room of the motor unit 2.

The hood B has a box-like shape with its lower and rear sides opened, defined by a ceiling surface portion 33, a reticulated front grille 34, and left and right side surface portions 35, 35. The ceiling surface portion 33 is in the shape of an inverted bilge (so-called bilge-shaped ceiling).

In a gap 36 formed between the hood B that covers the motor unit 2 having the above-described configuration and the operation unit 3, a heat exhaust cover 37 is disposed which has heat exhaust holes 38 as shown in FIG. 8 and FIG. 10. The heat exhaust cover 37 is connected to an upper portion of the hot-wind blocking plate 200.

The tractor A1 according to the embodiment of the present invention has the above-described basic structure.

Next, a specific configuration of a part around the fender 20R of the operation unit 3, which is an essential part of the present invention, will be described.

[Operation Unit]

The operation unit 3 of the tractor A1 according to this embodiment is configured as follows. In the operation unit 3 of the tractor in which the driver seat 13 is arranged at the rear of the steering wheel H and the loader manipulation part 29 and the hydraulic manipulation part 30 are arranged near the driver seat 13; the loader manipulation part 29 and the hydraulic manipulation part 30 are arranged within a semi-arc range over which a right arm of a driver turns about his/her right elbow which rests on the right arm rest 300R of the driver seat 13, as shown in FIG. 10. The loader manipulation part 29 and the hydraulic manipulation part 30 are disposed in such a range that the driver seated on the driver seat 13 is able to manipulate them with his/her right hand with his/her right elbow placed in a predetermined position on the arm rest 300R, that is, without moving his/her right elbow resting on the arm rest 300R.

Figure 12:
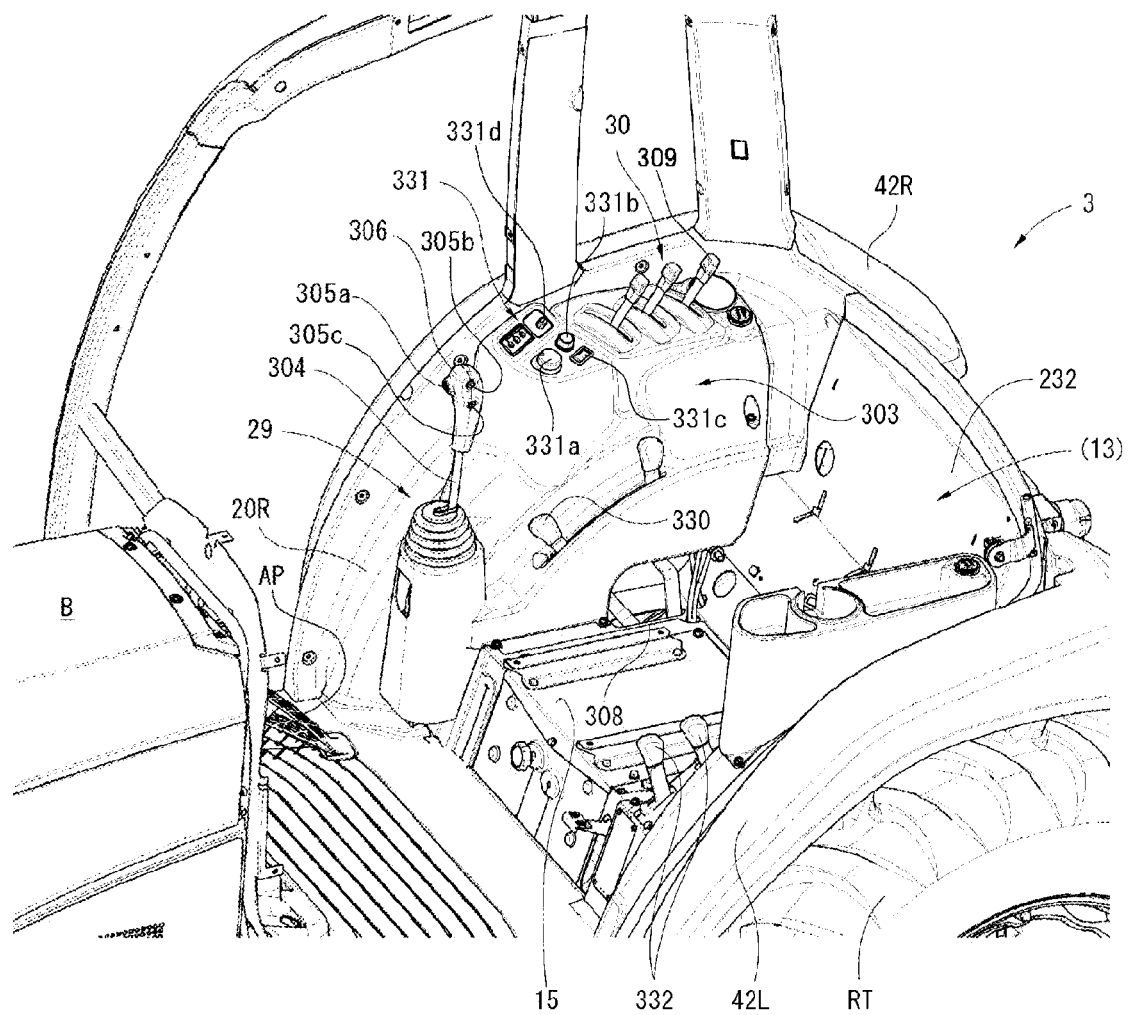
FIG. 12 A perspective view of the operation unit of the tractor according to the embodiment of the present invention.

A hydraulic pressure manipulation bracket 310, which is a bracket of the hydraulic manipulation part 30, is secured to a fender outer surface 302 of the fender 20 protruding in the cabin C that accommodates the operation unit 3, as shown in FIG. 12. The fender outer surface 302 of the fender 20, and the hydraulic pressure manipulation bracket 310 and a loader manipulation bracket 307 which is a bracket of the loader manipulation part 29 are collectively covered with a guide member 303 that supports the manipulation parts 29, 30.

As shown in FIG. 8 to FIG. 12, the operation unit 3 includes the steering wheel H in front of the driver seat 13, and a display device (not shown) installed in the dashboard 25 is provided in front of the steering wheel H. In the display device, various meter gauges are arranged. The various operation pedals 23 are arranged below the steering wheel H and above the floor surface.

On the left and right lateral sides of the driver seat 13, the fenders 20L, 20R having semi-arc shapes as shown in FIG. 13 are arranged so as to protrude toward the operation unit 3 in the cabin C. The loader manipulation part 29 for lifting and lowering a work machine, a hydraulic manipulation part 30 for performing operations regarding a hydraulic pressure, the other manipulation levers 330, 332, and the switches 331 are arranged on the right fender 20R, that is, on a fender outer surface 302 and thereabout. The loader manipulation part 29 and the hydraulic manipulation part 30 are arranged around the right arm rest 300R so as to form a semi-arc trajectory T in a plan view (see FIG. 10).

The loader manipulation part 29 and the hydraulic manipulation part 30 are arranged such that the height positions of their distal end portions are substantially at the same level and slightly higher than an upper surface of the right arm rest 300R. The loader manipulation part 29 is disposed at the rear of the acceleration pedal AP. The hydraulic manipulation part 30 is disposed at the rear of the loader manipulation part 29.

More specifically, the loader manipulation part 29 is configured as an integral loader lever including a loader manipulation lever body 304 having a rod-like shape and a grasp portion 306 with various manipulation switches (305a, 305b, 305c) by which mode switching, etc. is enabled, the grasp portion 306 being provided at the distal end of the loader manipulation lever body 304. As shown in FIG. 10 and FIG. 14, a loader manipulation bracket 307 is secured between the fender 20R and the right side of the front end of the driver seat 13, that is, secured on the seat frame 15 at a location between the driver seat 13 and the fender 20R. The loader manipulation bracket 307 is composed mainly of a substantially L-shaped rectangular plate member. The loader manipulation part 29, whose proximal portion is coupled to the loader manipulation bracket 307, stands such that it can be manipulated in a freely swingable manner. Alternatively, the loader manipulation part 29 may be arranged on an outer surface of the right fender 20R.

The loader manipulation part 29 is a lever manipulation part for switching a loader valve (not shown) that controls a hydraulic oil supply to hydraulic pressure equipment of the front loader 50. The loader valve is provided, for example, on a side surface portion of the machine body frame 1 with interposition of a bracket, etc. The loader manipulation lever body 304 of the loader manipulation part 29 is swingably supported on the loader manipulation bracket 307. The loader manipulation part 29 is coupled to the loader valve through push/pull wires 63, 64 which are coupled and fixed to the loader manipulation bracket 307 with interposition of a link member, etc.

The push/pull wire 63 has its distal end coupled to a left-right tilting link member. The left-right tilting link member is supported on the loader manipulation bracket 307 such that it is swingable in the left-right direction in line with a left-right tilt of the loader manipulation part 29. A left-right tilt of the loader manipulation part 29 causes a vertical movement of the distal end of the push/pull wire 63 through the left-right tilting link member.

The push/pull wire 64 has its distal end coupled to a front-rear tilting link member. The front-rear tilting link member is supported on the loader manipulation bracket 307 such that it is swingable in the front-rear direction in line with a front-rear tilt of the loader manipulation part 29. A front-rear tilt of the loader manipulation part 29 causes a vertical movement of the distal end of the push/pull wire 64 through the front-rear tilting link member.

The push/pull wire 64 is pushed and pulled in accordance with a front-rear tilt of the loader manipulation part 29, thereby actuating an arm valve of the above-described loader valve. As a result, the arm cylinders 57 are driven into extension and retraction, to rotate the left and right lift arms 52 in a lifting and lowering manner, so that the work equipment 56 is lifted and lowered. The push/pull wire 63 is pushed and pulled in accordance with a left-right tilt of the loader manipulation part 29, thereby actuating a work equipment valve of the loader valve. As a result, the work equipment cylinders 58 are driven into extension and retraction, to rotate the work equipment 56. When the work equipment 56 is rotated upward, a tilt operation of shoveling dirt, etc. occurs, and when the work equipment 56 is rotated downward, a dump operation of dumping dirt, etc. occurs.

The manipulation lever 330 is arranged at the rear of the loader manipulation bracket 307, the manipulation lever 330 protruding upward through an elongated hole 308 from the lower side thereof, the elongated hole 308 being formed in the seat frame 15 and elongated along the front-rear direction as its longitudinal direction. The manipulation lever 330 is another manipulation part which is manipulated at a relatively high frequency. As shown in FIG. 11 and FIG. 12, the distal end of the manipulation lever 330 is at a lever lower than the right arm rest 300R. The manipulation lever 330 is a work element position lever for changing and adjusting the height position of a ground-engaging work machine such as a rotary tiller.

The hydraulic manipulation part 30 is arranged on the right lateral side of the driver seat 13 and near an upper portion of the rear end of the fender 20R. In the hydraulic manipulation part 30, three hydraulic pressure manipulation levers (SCV levers) 309 for switching the hydraulic pressure output valve are arranged. Each hydraulic pressure manipulation lever 309 has a rod-like shape with a grasp portion provided at the distal end thereof. The three hydraulic pressure manipulation levers 309 are arranged adjacent to one another with respect to the front-rear direction. Here, the hydraulic pressure output valve is for controlling a hydraulic oil supply to hydraulic pressure equipment of a work machine, such as a rotary tiller or a compost-caster, which is attached to the rear of the tractor A1. The number of the hydraulic pressure manipulation levers 309 is according to the number of the hydraulic pressure output valves. In this embodiment, therefore, three hydraulic pressure output valves are provided.

As shown in FIG. 14, each hydraulic pressure manipulation lever 309 has its proximal portion coupled to the hydraulic pressure manipulation bracket 310. The hydraulic pressure manipulation bracket 310 is made mainly of a rectangular plate member bent along the fender 20R and secured to the fender outer surface 302 of the right fender 20R. Each hydraulic pressure manipulation lever 309 arranged in the hydraulic manipulation part 30, which has its proximal portion coupled to the hydraulic pressure manipulation bracket 310, stands such that it can be freely manipulated.

The switches 331 such as a mode switch, which are provided side by side in the later-described guide member 303, are arranged above a front portion of the hydraulic pressure manipulation bracket 310. More specifically, a PTO clutch switch 331a, a rotation-frequency/vehicle-speed setting dial 331b, a rotation-frequency/vehicle-speed selection switch 331c, and a vehicle speed sensitivity adjustment dial 331d are arranged as the switches 331 (see FIG. 12). The PTO clutch switch 331a is a manipulation part for engaging/disengaging a motive force transmission from the PTO shaft to a work machine such as a rotary tiller. The rotation-frequency/vehicle-speed setting dial 331b is a manipulation part for preliminarily setting a maximum rotation speed of the engine E or a maximum traveling speed of the machine body frame 1. The rotation-frequency/vehicle-speed selection switch 331c is a manipulation part for designating which of the maximum rotation speed of the engine E and the maximum traveling speed of the machine body frame 1 is to be set by the rotation-frequency/vehicle-speed setting dial 331b. The vehicle speed sensitivity adjustment dial 331d is a manipulation part for adjusting the acceleration and deceleration of the vehicle speed at a time of, for example, manipulating the acceleration pedal AP.

In the loader manipulation part 29, an engine boosting switch 305a is provided on a front surface of the grasp portion 306, while a valve manipulation switch 305b and a mode switch 305c are provided on a left side surface of the grasp portion 306. Since the grasp portion 306 is grasped by a right hand of an operator, the engine boosting switch 305a is arranged at such a position that it can be manipulated with, for example, an index finger, while the valve manipulation switch 305b and the mode switch 305c are arranged at such positions that they can be manipulated with, for example, a thumb. This allows the operator to easily manipulate the switches 305a, 305b, and 305c while grasping the loader manipulation part 29 at a time of performing a loader work by means of the front loader 50.

The engine boosting switch 305a is used in a case where, for example, a high load is applied when the front loader 50 performs a tilt operation of shoveling dirt, etc., a dozer operation of raking a ground surface, or the like. Manipulating the engine boosting switch 305a causes an engine boost control in which the engine rotation frequency of the engine E is raised while the speed change ratio of the hydraulic stepless transmission is lowered, to keep the vehicle speed of the tractor A1 constant. The engine boost control is performed while the engine boosting switch 305a is pressed and no mode switching control is performed by the mode switch 305c under a state where first and second are designated in a sub-transmission in which first, second, and third are designatable by a sub-transmission lever.

Since the engine boosting switch 305a is arranged in the loader manipulation part 29, the operator easily performs the engine boost control with his/her hand (in this embodiment, his/her right hand) manipulating the loader manipulation part 29 simultaneously upon determining that a high load work is in operation based on his/her acoustic sense and visual sense during a loader work with the front loader 50. Thus, even when a work load is not sufficient, a hydraulic lifting force applied to the arm cylinders 57 and the work equipment cylinders 58 can be increased instantaneously in response to the operator's determination. This can not only remove the complication involved in manipulating a work machine such as the front loader 50 but also reduce a burden on the work machine.

The valve manipulation switch 305b is used when a hydraulic pressure cylinder other than the arm cylinders 57 and the work equipment cylinders 58 is provided in the work equipment 56, for example, when a bale glove (not shown) configured to hold a roll of grass or the like is adopted as the work equipment 56 of the front loader 50. Manipulating the valve manipulation switch 305b causes bale glove cylinders of the bale glove serving as the work equipment 56 to extend or retract, thus allowing the roll of grass to be held or released.

The loader manipulation part 29 is tilted in the front-rear direction to actuate the arm cylinders 57 so that the work equipment 56 is vertically lifted and lowered, while the loader manipulation part 29 is tilted in the left-right direction to actuate the work equipment cylinders 58 so that the bale glove serving as the work equipment 56 is vertically tilted, and moreover the valve manipulation switch 305b of the loader manipulation part 29 is manipulated to actuate the bale glove cylinders so that an open/close operation of the bale glove serving as the work equipment 56 is performed. Thus, for example, when the bale glove is adopted as the work equipment 56, a work of loading the roll of grass onto a loading platform can be performed only with the loader manipulation part 29, which improves operability for the operator.

The mode switch 305c is used for switching the maximum rotation speed and the maximum speed which are preliminarily set for each of a plurality of modes. Although this embodiment is described on the assumption that there are two modes of a first mode and a second mode, it may be acceptable that three or more modes are set. The maximum rotation speed and the maximum vehicle speed in the first and second modes are set by manipulation of the rotation-frequency/vehicle-speed setting dial 331b and the rotation-frequency/vehicle-speed selection switch 331c which serve as a rotation-frequency/vehicle-speed setting manipulation tool. As the maximum rotation speed and the maximum vehicle speed that are set in each of the first and second modes, the rotation speed of the engine E and the vehicle speed of the tractor A1 obtained when the accelerator lever 65 and the acceleration pedal AP are at the maximum position are adopted.

Manipulating the mode switch 305c causes switching between the first mode and the second mode, and the maximum rotation speeds and the maximum vehicle speeds in the first and second modes are switched in accordance with the manipulation of the mode switch 305c. In this embodiment, such setting is made that the maximum rotation speed and the maximum vehicle speed in the second mode are lower than the maximum rotation speed and the maximum vehicle speed in the first mode.

For example, when the work equipment 56 holds a transport object (dirt, snow, a roll of grass, etc.) during a transport work with use of the front loader 50, the mode switch 305c is manipulated to switch to the second mode, thereby causing the tractor A1 to move at a low speed, which can prevent the transport object from dropping. When there is no transport object in the work equipment 56, the mode switch 305c is manipulated to switch to the first mode, thereby causing the tractor A1 to move at a high speed, which can shorten a time taken for movement from a transport source to a transport destination, thus enabling improvement in the work efficiency.

Since the mode switch 305c is arranged in the loader manipulation part 29, the operator can easily switch the moving speed of the tractor A1 with his/her hand (in this embodiment, his/her right hand) manipulating the loader manipulation part 29 based on the presence or absence of a transport object during a transport work with use of the front loader 50. This can prevent a transport object from dropping when the front loader 50 transports the transport object, and can shorten a movement time after the transport of the transport object is completed, thus enabling improvement in the work efficiency.

In the tractor A1 according to this embodiment, an accelerator-linked control is performed as an operation control associated with the acceleration pedal AP. In a case where the accelerator-linked control is performed, the vehicle speed obtained when only the acceleration pedal AP is at the maximum position is adopted as the maximum vehicle speed set in each mode. In a case where the accelerator-linked control is not performed, the vehicle speed obtained when each of the acceleration pedal AP and the accelerator lever 65 is at the maximum position is adopted as the maximum vehicle speed set in each mode.

In a case where the accelerator-linked control is performed, the vehicle speed of the tractor A1 changes in accordance with the amount of pressing of the acceleration pedal AP, while the rotation frequency of the engine E changes from the minimum rotation frequency set by the accelerator lever 65. For example, as the amount of pressing of the acceleration pedal AP increases, the rotation frequency of the engine E increases while the vehicle speed of the tractor A1 increases. In a case where the accelerator-linked control is not performed, the vehicle speed of the tractor A1 changes in accordance with the amount of pressing of the acceleration pedal AP with the rotation frequency of the engine E being kept constant at the minimum rotation frequency set by the accelerator lever 65. For example, as the amount of pressing of the acceleration pedal AP increases, the vehicle speed of the tractor A1 increases while the rotation frequency of the engine E is kept at the minimum rotation frequency set by the accelerator lever 65. A switch for performing the accelerator-linked control is arranged on an upper surface of the steering column 24, for example.

Figure 15:
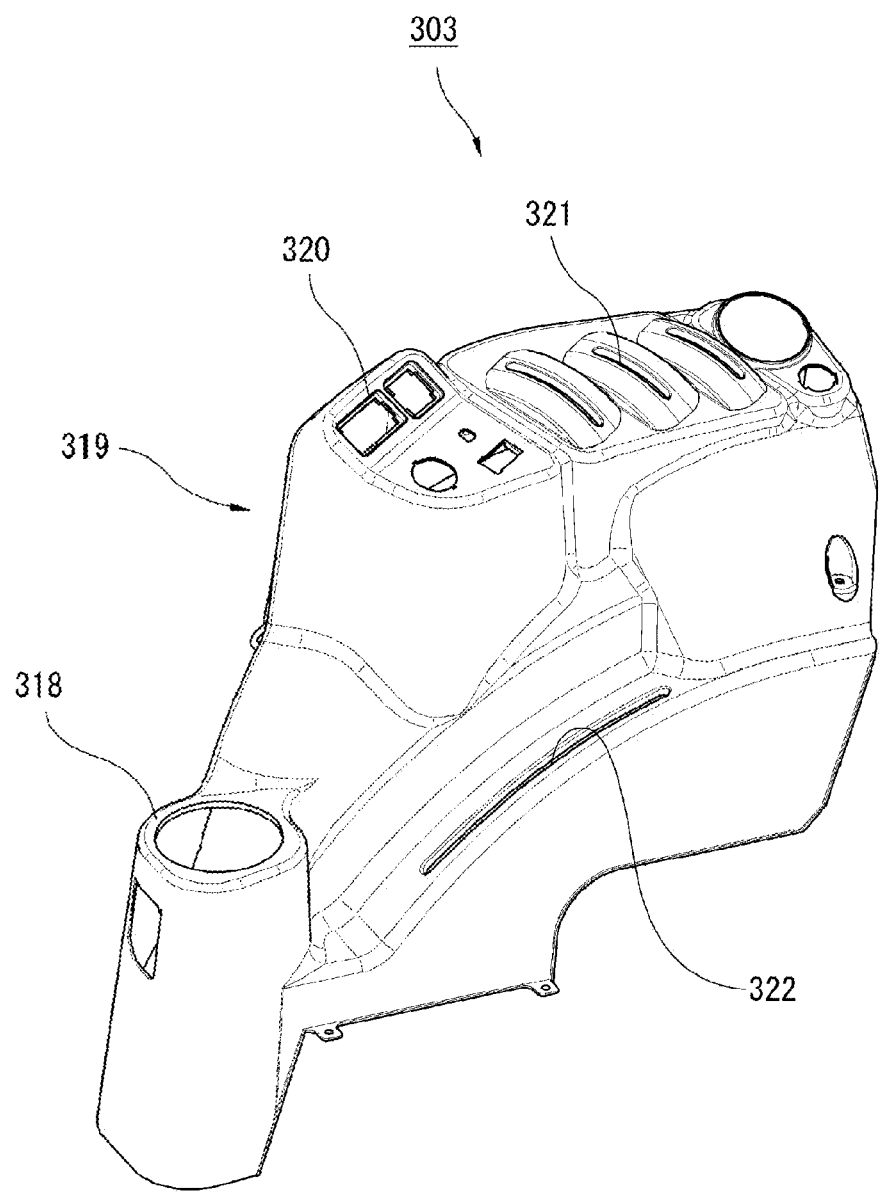
FIG. 15 A perspective view of a guide member of the tractor according to the embodiment of the present invention.
Figure 16:
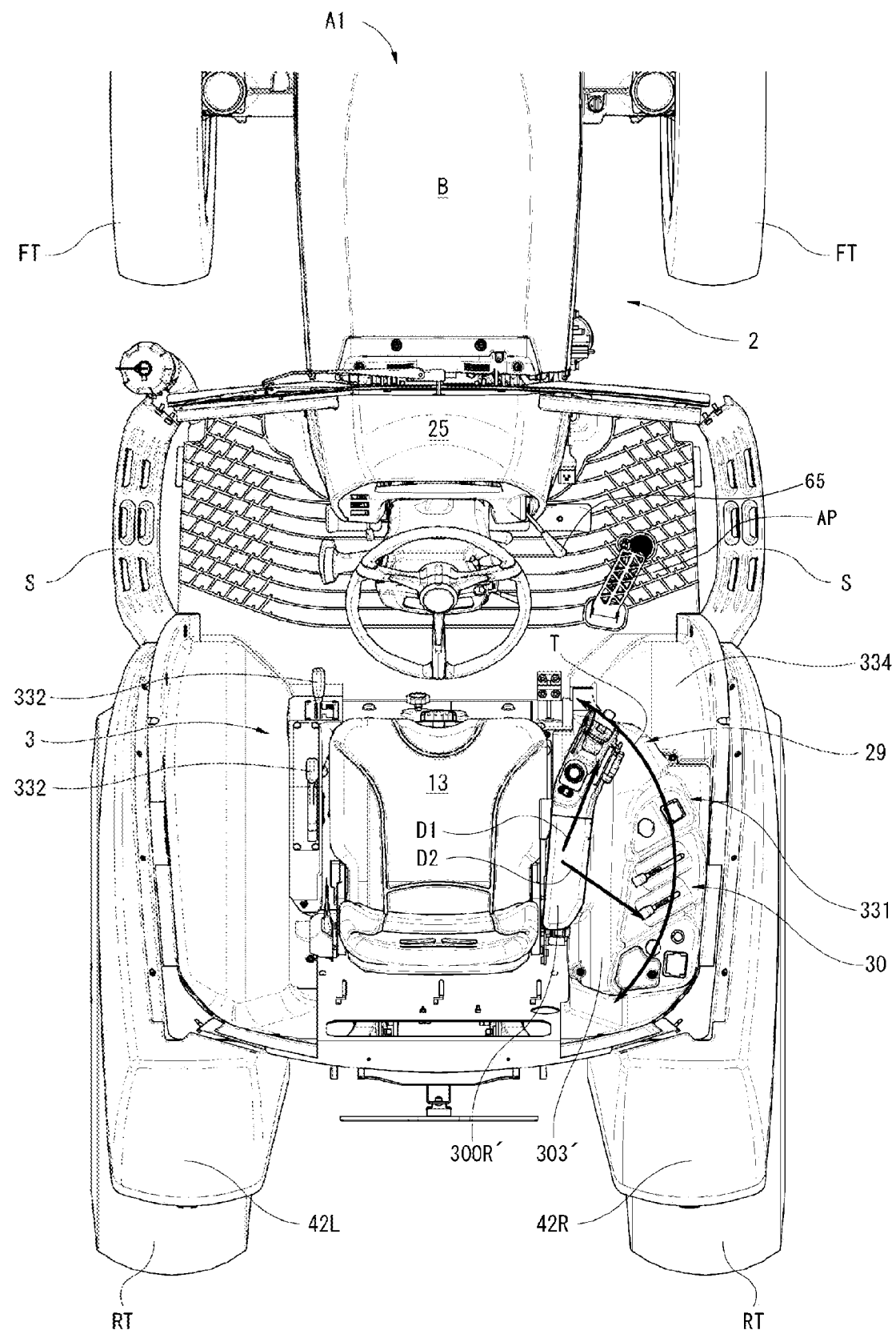
FIG. 16 A plan view of an operation unit in a variation of the tractor according to the embodiment of the present invention.
Figure 17:
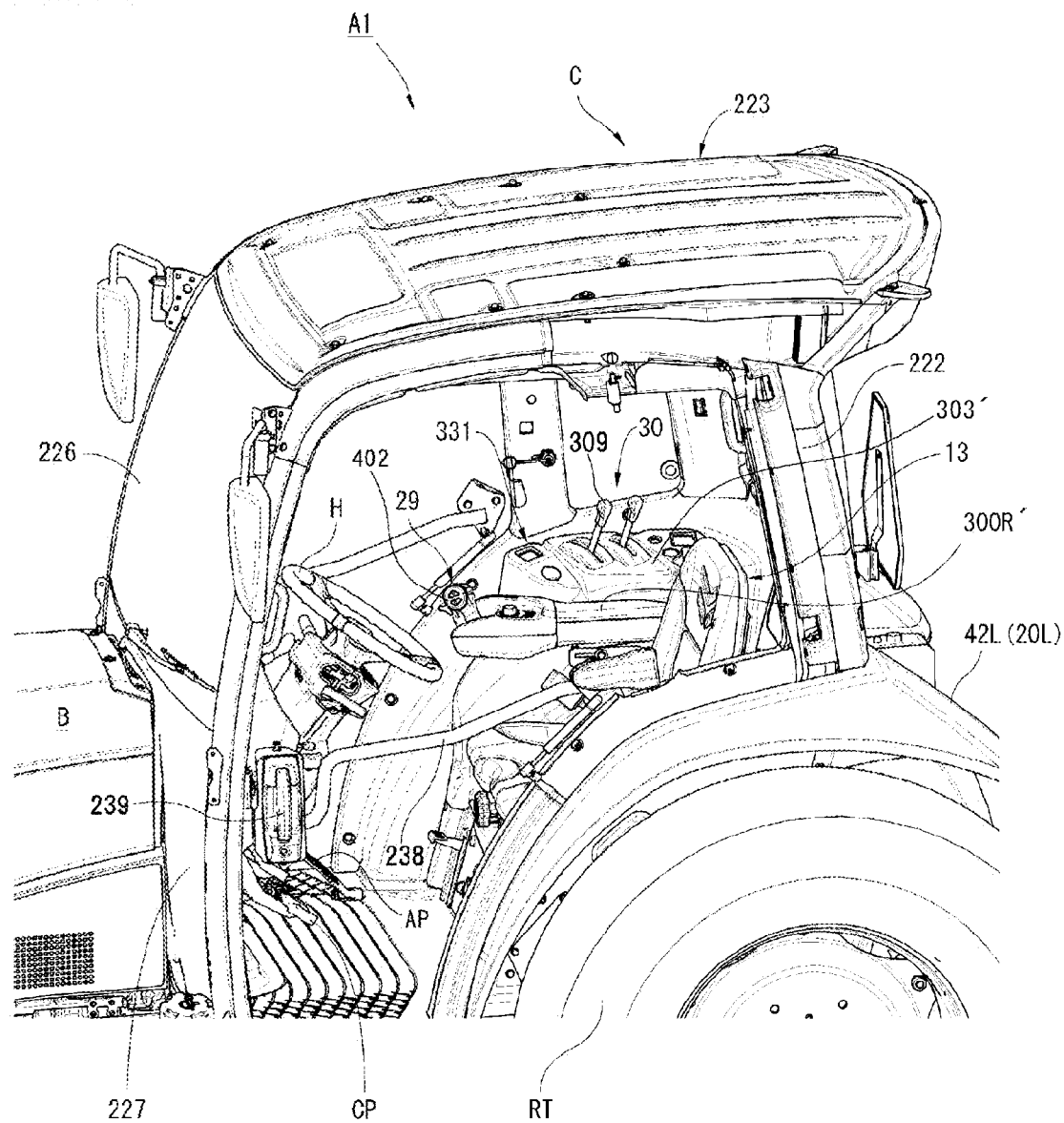
FIG. 17 A perspective view of the operation unit in the variation of the tractor according to the embodiment of the present invention.

As shown in FIG. 12, various manipulation parts such as the loader manipulation part 29 and the hydraulic manipulation part 30 arranged in the above-described manner are collectively covered with the brackets 307, 310, the fender 20R exposed to the operation unit 3, and the guide member 303 shown in FIG. 15. The guide member 303 is given a color different from a color of peripheral members adjacent to the guide member 303. This makes it easy to visually recognize that a region where the various manipulation parts such as the loader manipulation part 29 and the hydraulic manipulation part 30 are arranged is a region which is to be manipulated differently from the steering wheel H.

As shown in FIG. 10 and FIG. 12, the manipulation lever 332 is arranged on the seat frame 15 and on the left lateral side of the driver seat 13. As shown in FIG. 4, the manipulation lever 332 protrudes upward through an elongated hole 315 from the lower side thereof, the elongated hole 315 being formed in the seat frame 15 and elongated along the front-rear direction as its longitudinal direction. The manipulation lever 332 is another manipulation part which is manipulated at a low frequency. As the manipulation lever 332, for example, a sub-transmission lever for switching an output range of a traveling sub-transmission gear mechanism disposed in the transmission case M and a 4WD lever for switching between 2WD and 4WD of the front and rear wheels FT, RT are arranged.

As shown in FIG. 15, the guide member 303, which has a substantially curved concave shape with its lower side opened, is a member capable of covering a part of an upper portion of most of a side portion of the fender outer surface 302 of the fender 20R. In a front end portion of the guide member 303, a loader manipulation lever insertion hole 318 is formed through which the loader manipulation lever body 304 of the loader manipulation part 29 is inserted. In the guide member 303, a portion having the loader manipulation lever insertion hole 318 is a portion in the shape of a cylinder standing upward from the floor surface of the operation unit floor 9 in an external appearance view. The portion has an opening on the lower end side thereon.

In a middle portion of the guide member 303 on the upper side, a switch mount portion 319 is provided in a standing manner, the switch mount portion 319 being in the shape of a rectangular box and configured to cover mechanism parts of the various switches 331, etc. when the various switches 331, etc. are attached to the switch mount portion 319 in a manipulatable manner. The switch mount portion 319 has a plurality of switch mount holes 320 so that respective manipulation parts of the switches 331 are exposed from a surface.

In a rear end portion of the guide member 303 on the upper side, hydraulic pressure manipulation lever insertion elongated holes 321 are formed through which the hydraulic pressure manipulation levers 309 of the hydraulic manipulation part 30 are inserted. The hydraulic pressure manipulation lever insertion elongated holes 321 are formed such that their longitudinal direction is inclined at an angle of approximately 45° relative to the front-rear direction in a plan view. The hydraulic pressure manipulation lever insertion elongated holes 321 are formed so as to extend obliquely frontward from the inner side toward the outer side of with respect to the left-right direction of the vehicle. The three hydraulic pressure manipulation lever insertion elongated holes 321 are adjacent in parallel to one another with respect to the front-rear direction.

In a middle portion of a side portion of the guide member 303, a lever insertion elongated hole 322 is formed through which the manipulation lever 330 is inserted. The lever insertion elongated hole 322 is a guide hole elongated in the front-rear direction in a plan view. The lever insertion elongated hole 322 is formed at a level lower than the loader manipulation lever insertion hole 318, the switch mount holes 320, and the hydraulic pressure manipulation lever insertion elongated holes 321 described above.

Although the guide member 303 of this embodiment has the above-described configuration, an exposed portion of the fender 20R not covered with the guide member 303 may be covered with another fender cover (not shown).

A layout of the loader manipulation part 29 and the hydraulic manipulation part 30 will now be detailed on the basis of the right arm rest 300R as a reference. The loader manipulation part 29 is located in front of the right arm rest 300R and slightly on the right side in a plan view. The hydraulic manipulation part 30 is located on the right lateral side of the right arm rest 300R and curved outward from a position corresponding to the middle portion of the right arm rest 300R toward a position corresponding to the rear end portion of the right arm rest 300R in a plan view.

A trajectory connecting the loader manipulation part 29 to the hydraulic manipulation part 30 in a plan view is located on the semi-arc trajectory T, as shown in FIG. 10. More specifically, the trajectory (T) having an arc-like shape in a plan view passes through a movable range of the loader lever serving as the loader manipulation part 29 and a movable range of each hydraulic pressure manipulation lever 309 of the hydraulic manipulation part 30. That is, each of the loader manipulation part 29 and the hydraulic manipulation part 30 is arranged such that any manipulation position within the movable range of its manipulation part (lever) is located on the arc-like trajectory (T) in a plan view.

As shown in FIG. 10, the loader manipulation part 29 is provided substantially in front of the right arm rest 300R (see the arrow D1), and the hydraulic manipulation part 30 is provided to the right of the right arm rest 300R, the position of the hydraulic manipulation part 30 being in a direction substantially perpendicular (see the arrow D2) to the right arm rest 300R. In a region at an angle of 45° relative to the right of right arm rest 300R, any manipulation lever having substantially the same height as the height of the loader manipulation part 29, etc. is arranged. In this region, the manipulation lever 330 and the various switches 331 having different heights are arranged.

This way, the manipulation lever 330 which is manipulated at a relatively high frequency and arranged in the region at an angle of 45° relative to the right of the right arm rest 300R where the loader manipulation part 29 and the hydraulic manipulation part 30 are not located is clearly separate from the manipulation parts 29, 30 in terms of arrangement, the separation including the fact that the height of the distal end portion of the manipulation lever 330 is obviously lower than the heights of the manipulation parts 29, 30.

The tractor A1 according to this embodiment includes the accelerator-linked acceleration pedal AP for controlling the rotation speed of the engine E or the vehicle speed, and the loader manipulation part 29 is provided at the rear of the acceleration pedal AP. This configuration enables the rotation speed of the engine E or the vehicle speed to be controlled by pedal manipulation on the acceleration pedal AP, without the need to provide a hand-operable manipulation member such as a main transmission lever as a main transmission manipulation member. Accordingly, hand-operated manipulation objects can be reduced, which can improve workability at a time of manipulating the loader manipulation part 29, and also can reduce a work burden on the driver at a time of manipulating the loader manipulation part 29.

[Variation]

The loader manipulation part 29 may be arranged in a distal end portion of the right arm rest 300R', as in a variation shown in FIG. 16 to FIG. 22.

Figure 18:
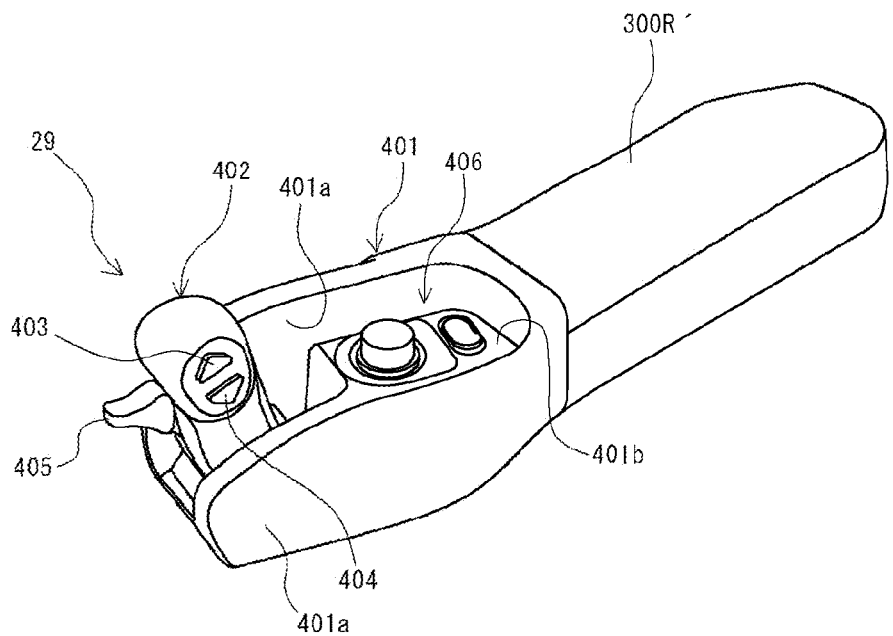
FIG. 18 A perspective view of a loader manipulation part in the variation of the tractor according to the embodiment of the present invention.

As shown in FIG. 18, the loader manipulation part 29 of this variation includes a loader manipulation lever body 402 that is supported on a distal end portion of a lever support portion 401 such that the loader manipulation part 29 is tiltable in the front-rear direction, the lever support portion 401 extending frontward integrally with the right arm rest 300R' at a location on the distal end side of the right arm rest 300R'. The lever support portion 401 has support side wall portions 401a facing each other with respect to the left-right direction. The loader manipulation lever body 402 is borne between the left and right support side wall portions 401a, and the axis of rotation of the loader manipulation lever body 402 is along the left-right direction. The loader manipulation lever body 402 extends upward (in more detail, obliquely upward and frontward) from a front end portion of the lever support portion 401. The loader manipulation part 29 is coupled to the loader valve through the two push/pull wires as described above.

The loader manipulation lever body 402 has, on a left side surface thereof, rotational manipulation switches 403, 404 for rotating the work equipment 56 of the front loader 50. The rotational manipulation switches 403, 404 are provided at two locations along the longitudinal direction of the loader manipulation lever body 402. The rotational manipulation switches 403, 404 are button type switches to be pushed. Pushing the upper rotational manipulation switch 403 causes the work equipment 56 to rotate in one direction (upward), and pushing the lower rotational manipulation switch 404 causes the work equipment 56 to rotate in the other direction (downward).

One of the two push/pull wires is pushed and pulled in accordance with a front-rear tilt of the loader manipulation lever body 402, thereby actuating an arm valve of the loader valve. As a result, the arm cylinders 57 of the front loader 50 are driven into extension and retraction, to rotate the left and right lift arms 52 in a lifting and lowering manner, so that the work equipment 56 is lifted and lowered.

The other of the two push/pull wires is pushed and pulled in accordance with pushing of either of the rotational manipulation switches 403, 404 on a side surface of the loader manipulation lever body 402, thereby actuating a work equipment valve of the loader valve. As a result, the work equipment cylinders 58 of the front loader 50 are driven into extension and retraction, to rotate the work equipment 56.

On the front side of the loader manipulation lever body 402, a lifting/lowering lever 405 protrudes for a fine adjustment of the lifting and lowering of the work equipment 56 in relation to a lifting and lowering operation of the work equipment 56 of the front loader 50. The lifting/lowering lever 405 is a tab type lever vertical movable relative to the loader manipulation lever body 402. Moving the lifting/lowering lever 405 upward causes the work equipment 56 to ascend little by little due to an operation of the arm cylinders 57, and moving the lifting/lowering lever 405 downward causes the work equipment 56 to descend little by little due to an operation of the arm cylinders 57.

At the rear of the loader manipulation lever body 402 of the lever support portion 401, a switch arrangement surface portion 401b is provided. Switches 406 are arranged in the switch arrangement surface portion 401b. As the switches 406, for example, the rotation-frequency/vehicle-speed setting dial and the rotation-frequency/vehicle-speed selection switch described above are arranged.

In this variation as well, in the plan-view layout described above, the loader manipulation part 29 is provided substantially in front of the right arm rest 300R' (see the arrow D1), and the hydraulic manipulation part 30 is provided to the right of the right arm rest 300R', the position of the hydraulic manipulation part 30 being in a direction substantially perpendicular (see the arrow D2) to the right arm rest 300R'. In this variation, the hydraulic manipulation part 30 includes two hydraulic pressure manipulation lever 309. Here, as mentioned above, the number of hydraulic pressure manipulation levers 309 is according to the number of hydraulic pressure output valves, and not limited to the one illustrated in this embodiment.

Figure 19:
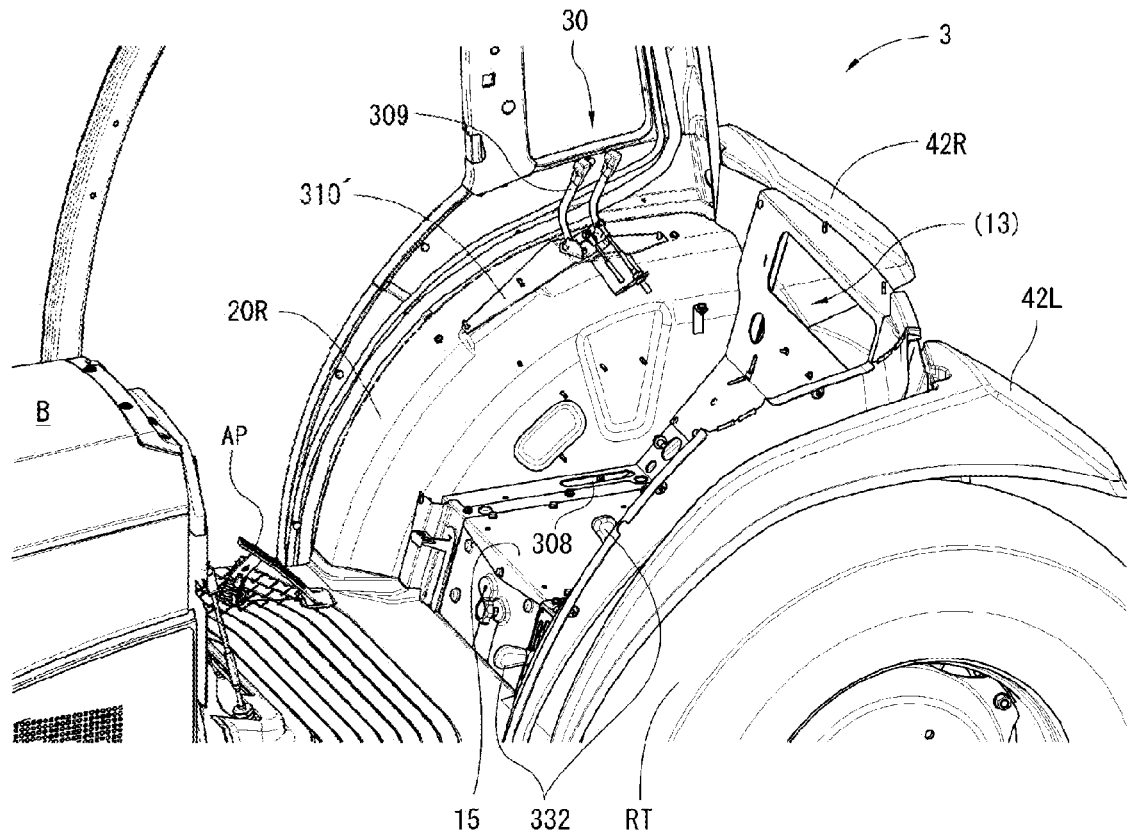
FIG. 19 A perspective view of the operation unit in the variation of the tractor according to the embodiment of the present invention.
Figure 20:
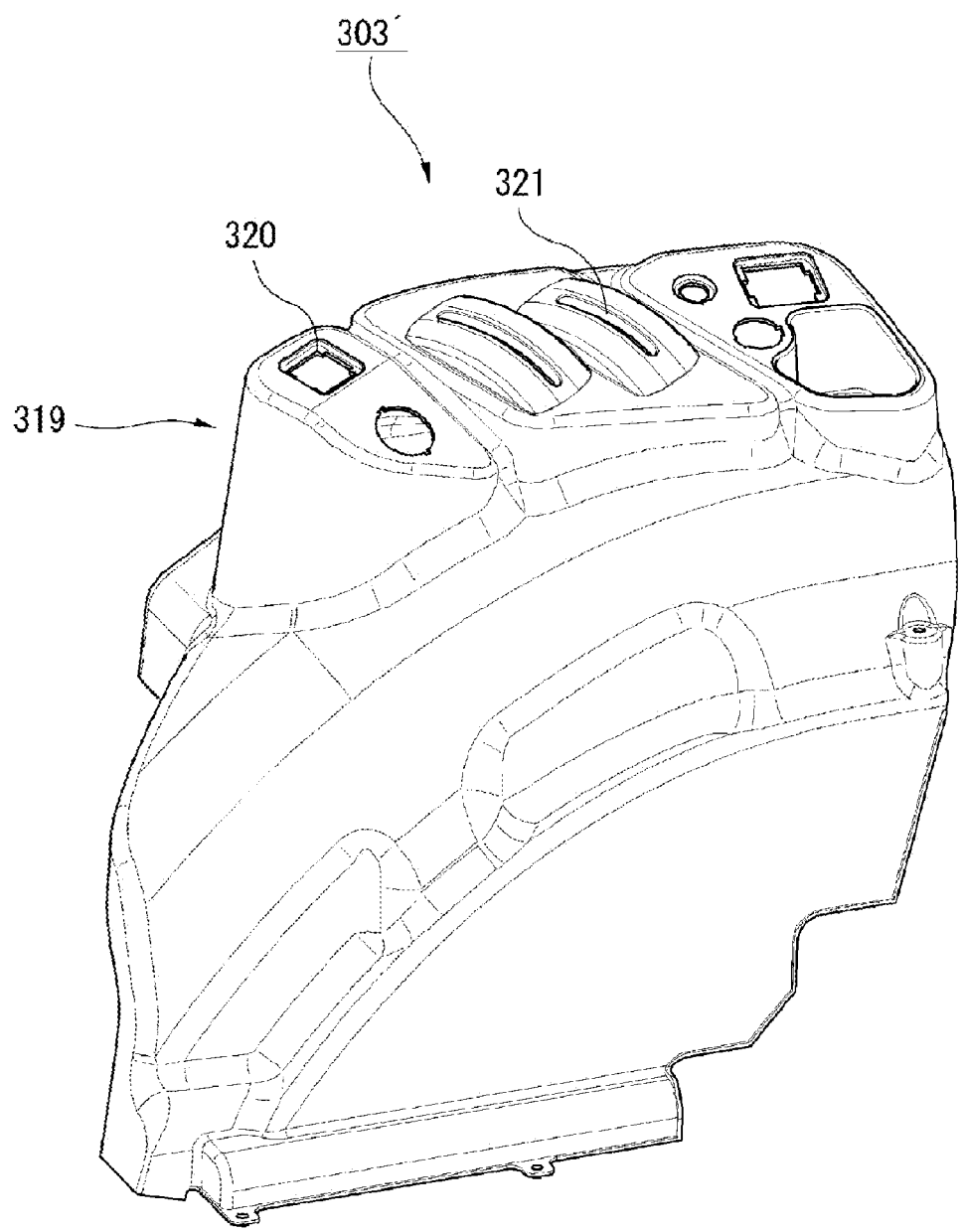
FIG. 20 A perspective view of a guide member in the variation of the tractor according to the embodiment of the present invention.
Figure 21:
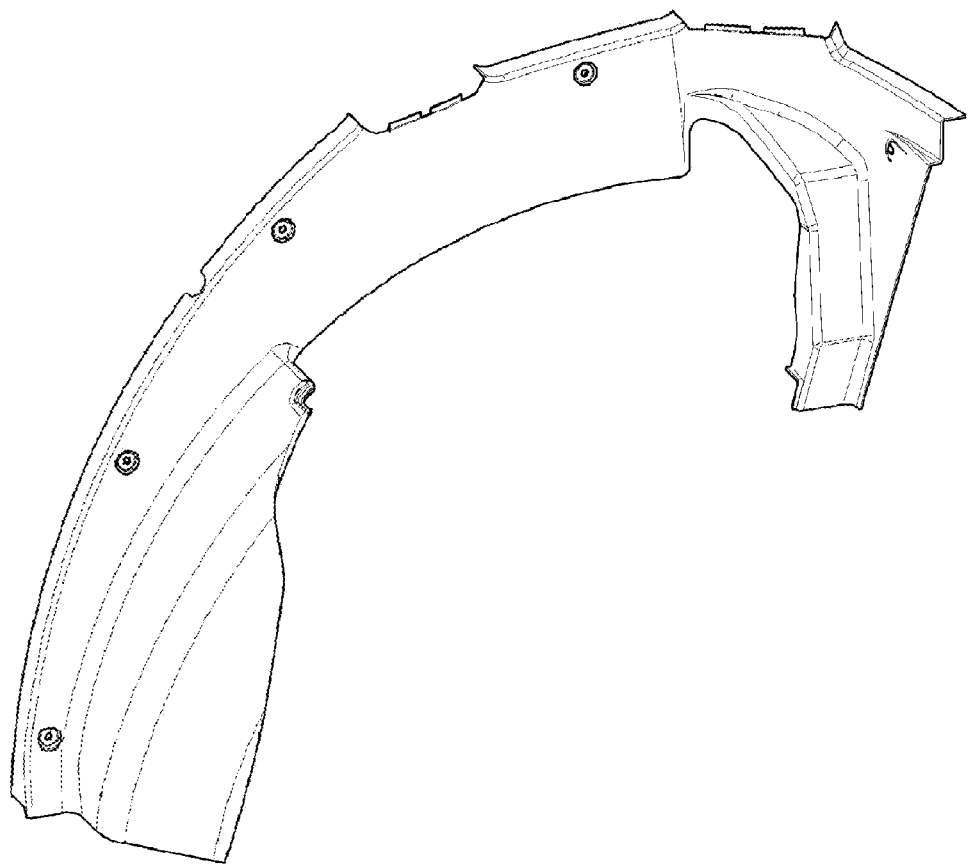
FIG. 21 A perspective view of a covering member of the tractor according to the embodiment of the present invention.
Figure 22:
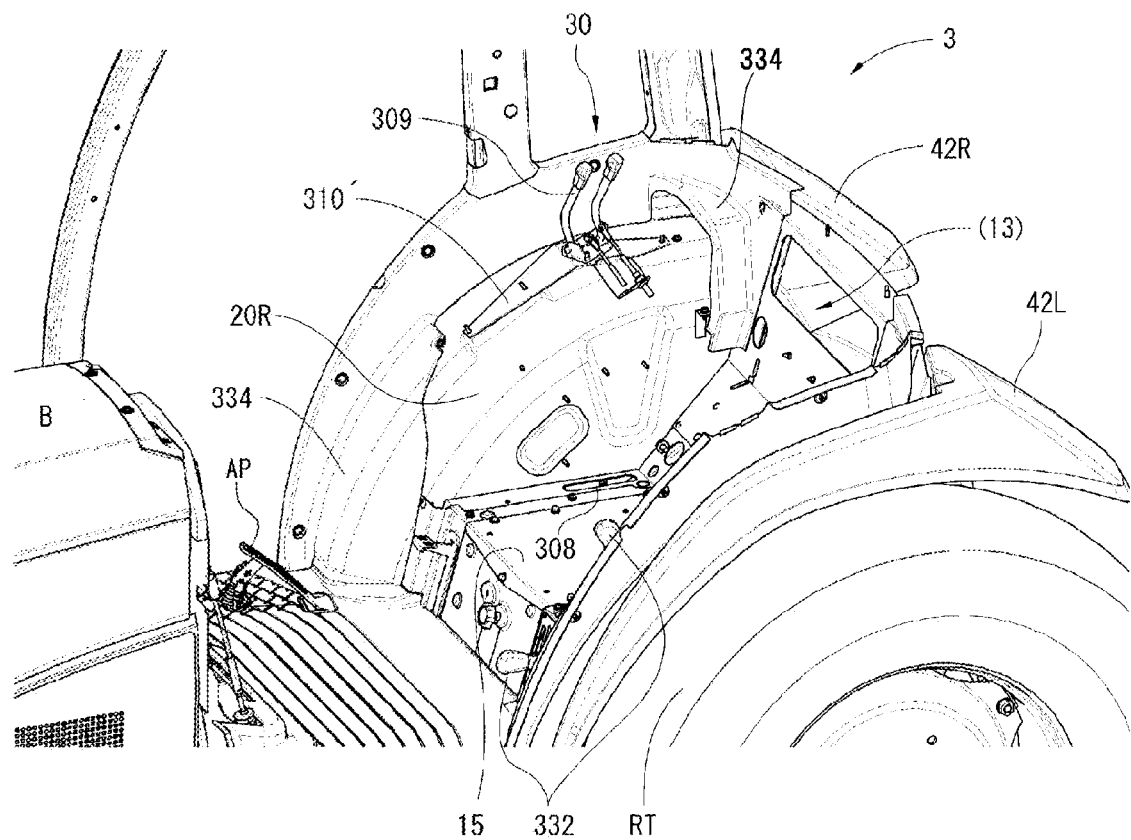
FIG. 22 A perspective view of the operation unit in the variation of the tractor according to the embodiment of the present invention.

FIG. 19 shows a state where the hydraulic pressure manipulation lever 309 is manipulatably provided in a standing manner on the fender 20R with interposition of a hydraulic pressure manipulation bracket 310' according to the variation. FIG. 20 shows a guide member 303' according to the variation. FIG. 21 shows a covering member 334 for covering an exposed portion of the fender 20R which is not covered with the guide member 303'. FIG. 22 shows a state where a part of the fender 20R is covered with the covering member 334.

The tractor A1 according to this embodiment having the above-described configuration includes the operation unit 3 in which the driver seat 13 is arranged at the rear of the steering wheel H and the loader manipulation part 29 and the hydraulic manipulation part 30 are arranged near the driver seat 13, the loader manipulation part 29 and the hydraulic manipulation part 30 being arranged in a semi-arc range over which the right arm of the driver turns about his/her right elbow which rests on the right arm rest 300R of the driver seat 13. This configuration allows the steering wheel H, and the loader manipulation part 29 and the hydraulic manipulation part 30 to be reliably grasped with different hands, so that driving of the tractor A1 and manipulation of, for example, towing a work machine can be separated distinctly and performed concurrently. Accordingly, not only improvement in the workability but also considerable relief of work fatigue can be obtained, because the loader manipulation part 29 and the like can be manipulated with the right elbow placed on the arm rest 300R.

Since manipulation parts other than the loader manipulation part 29 and the hydraulic manipulation part 30 can be arranged within the semi-arc range over which the right arm turns, further improvement in the workability can be obtained.

The hydraulic pressure manipulation bracket 310, which is a bracket of the hydraulic manipulation part 30, is secured to the fender outer surface 302 of the fender 20 protruding in the cabin C that accommodates the operation unit 3. The tractor A1 is configured such that the fender outer surface 302 of the fender 20R and the brackets 307, 310 of the manipulation parts 29, 30 are collectively covered with the guide member 303 that supports the manipulation parts 29, 30. Such a configuration, in which the manipulation parts 29, 30 are collectively arranged, can give visual integration to an external appearance, and also can allow driving of the tractor A1 with the steering wheel H and manipulation of, for example, towing a work machine with the manipulation parts 29, 30, etc. to be distinctly separated in a visual sense, too, so that improvement in the workability can be obtained.

Since the brackets 307, 310 of the loader manipulation part 29 and the hydraulic manipulation part 30 can be collectively covered with the guide member 303 instead of being respectively covered with different members, the workability in assembling can be improved, and moreover manufacture costs can be suppressed low.

While a preferred embodiment of the present invention has been described above, the present invention is not limited to such a specific embodiment, but various changes and modifications can be made within the scope of the essence of the present invention as set forth in the claims.

The above-described embodiment adopts a configuration in which: the loader manipulation bracket 307 and the hydraulic pressure manipulation bracket 310 corresponding respectively to the loader manipulation part 29 and the hydraulic manipulation part 30 are provided; the hydraulic pressure manipulation bracket 310 is secured to the fender outer surface 302; and both of the brackets 307, 310 and the fender outer surface 302 are collectively covered with the guide member 303. In this respect, covering with the guide member 303 is not limited to such a configuration, and for example, the fender outer surface 302 and either one of the loader manipulation bracket 307 and the hydraulic pressure manipulation bracket 310 may be collectively covered with the guide member 303, as illustrated in the variation.

REFERENCE SIGNS LIST

A1 tractor
C cabin
H steering wheel
3 driver seat
20 fender
29 loader manipulation part
30 hydraulic manipulation part
50 front loader
300R right arm rest
302 fender outer surface
303 guide member
303' guide member according to a variation
307 loader manipulation bracket
309 hydraulic pressure manipulation lever
310 hydraulic pressure manipulation bracket

The invention claimed is:
1. A tractor comprising:
an operation unit comprising:
a moveable loader manipulation part that includes a mode switch configured to switch a maximum rota- tional speed and a maximum speed of an engine for a predetermined plurality of modes; and a hydraulic manipulation part that are arranged near a driver seat disposed rearward of a steering wheel, wherein the loader manipulation part and the hydraulic manipulation part are arranged along a semi-circular arc in a plan view which translates about a pivot point positioned on a right arm rest of the driver seat.

2. The tractor according to claim 1, wherein:

a bracket of the hydraulic manipulation part is secured to an outer surface of a fender positioned in a cabin that accommodates the operation unit, and the outer surface of the fender and at least the bracket of the hydraulic manipulation part and a bracket of the loader manipulation part are collectively covered with a guide member that supports the loader manipulation part and the hydraulic manipulation part.

3. The tractor according to claim 2, further comprising:

an accelerator-linked main transmission pedal provided forward of the loader manipulation part.

4. The tractor according to claim 1, further comprising:

an accelerator-linked main transmission pedal configured to control an engine rotation speed or a vehicle speed, the loader manipulation part disposed rearward of the accelerator-linked main transmission pedal; and wherein the loader manipulation part is positioned closer to a longitudinal centerline of the driver seat than the hydraulic manipulation part is positioned to the longitudinal centerline.

5. The tractor according to claim 1, wherein the loader manipulation part further includes:

an engine boosting switch configured to activate an engine boost control in which an engine rotation frequency of the engine is raised while a speed change ratio of a hydraulic stepless transmission is lowered to keep a vehicle speed of a tractor constant; and a valve manipulation switch configured to adjust a hydraulic cylinder of a front loader.

6. The tractor of claim 1, wherein:

the loader manipulation part further includes:

an engine boosting switch configured to activate an engine boost control in which an engine rotation frequency of an engine is raised while a speed change ratio of a hydraulic stepless transmission is lowered to keep a vehicle speed of a tractor constant;

a valve manipulation switch configured to adjust a hydraulic cylinder of a front loader; and a first lever; and the hydraulic manipulation part comprises a plurality of second levers.

7. A tractor comprising:

an operation unit comprising:

a moveable loader manipulation part; and a hydraulic manipulation part that are arranged near a driver seat disposed rearward of a steering wheel;

a driver seat of the tractor;

a right arm rest;

a fender positioned adjacent to the right arm rest; and wherein:

the loader manipulation part is disposed on an outer surface of the fender and configured to control a front loader of a tractor;

the hydraulic manipulation part is configured to switch a hydraulic pressure output valve; and the loader manipulation part and the hydraulic manipulation part:

are attached to the outer surface of the fender; and are arranged along a semi-circular arc in a plan view which translates about a pivot point positioned on a right arm rest of the driver seat, the semi-circular arc being equidistant from the pivot point.

8. The tractor according to claim 7, further comprising:

a grasp portion of the loader manipulation part comprising an engine boosting switch, a valve manipulation switch, and a mode switch; and wherein:

a maximum speed of an engine is set in advance for a plurality of modes.

* * * * *